(12) United States Patent
Shima

(10) Patent No.: US 7,493,557 B2
(45) Date of Patent: Feb. 17, 2009

(54) SOURCE FILE GENERATION APPARATUS

(75) Inventor: Toshihiro Shima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 234 days.

(21) Appl. No.: 10/489,246

(22) PCT Filed: Sep. 11, 2002

(86) PCT No.: PCT/JP02/09309

§ 371 (c)(1),
(2), (4) Date: Mar. 11, 2004

(87) PCT Pub. No.: WO03/025786

PCT Pub. Date: Mar. 27, 2003

(65) Prior Publication Data

US 2004/0237043 A1    Nov. 25, 2004

(30) Foreign Application Priority Data

Sep. 12, 2001    (JP)    ............................. 2001-276790

(51) Int. Cl.
  G06F 17/00    (2006.01)
  G06F 17/24    (2006.01)
(52) U.S. Cl. .................. 715/255; 715/204; 715/205; 715/208; 715/228; 715/234; 715/251; 715/273
(58) Field of Classification Search ................. 715/530, 715/517, 519, 520, 521, 205, 208, 228, 234, 715/255, 204, 251, 273
See application file for complete search history.

(56) References Cited

U.S. PATENT DOCUMENTS 4,996,665 A    2/1991    Nomura 5,845,299 A    12/1998    Arora et al.
6,275,223 B1 *    8/2001    Hughes ...................... 715/751

(Continued)

FOREIGN PATENT DOCUMENTS

EP    1 094 402 A    4/2001

(Continued)

OTHER PUBLICATIONS

"Epic Editor Lose Up", Sep. 2001, Arbortext, Ann Arbor, MI, USA, XP002342280.

(Continued)

*Primary Examiner*—Rachna Desai
*Assistant Examiner*—Chau Nguyen
(74) *Attorney, Agent, or Firm*—Sughrue Mion, PLLC

(57) ABSTRACT

The present invention provides a technique of simply editing a source file described in a markup language.

An editing server 700 receives specification data from a client 800 and edits an original source file in units of divisions in a grammatical framework, so as to create an edited source file. Editing-related buttons for specifying deletion and decomposition of each division is added to the division. The user operates these buttons to edit the original source file in the markup language in units of the divisions. The editing method of obtaining a user's desired edited source file from the original source file is specified by parameters in a URL. The URL is adopted to readily and conveniently give a desirably edited image output from the original source file without storing the edited source file.

4 Claims, 18 Drawing Sheets

U.S. PATENT DOCUMENTS

| | | | |
|---|---|---|---|
| 6,401,077 B1 * | 6/2002 | Godden et al. | 715/234 |
| 6,664,966 B1 * | 12/2003 | Ibrahim et al. | 345/474 |
| 6,769,095 B1 * | 7/2004 | Brassard et al. | 715/513 |
| 6,792,595 B1 * | 9/2004 | Storistenau et al. | 717/110 |
| 6,851,089 B1 * | 2/2005 | Erickson et al. | 715/513 |
| 2002/0073125 A1 * | 6/2002 | Bier | 345/474 |
| 2002/0078140 A1 * | 6/2002 | Kelly et al. | 707/513 |
| 2002/0116413 A1 * | 8/2002 | Clark | 707/513 |
| 2002/0138331 A1 * | 9/2002 | Hosea et al. | 705/10 |
| 2003/0023630 A1 * | 1/2003 | Barmettler | 715/234 |
| 2006/0095836 A1 * | 5/2006 | Ono et al. | 715/513 |

FOREIGN PATENT DOCUMENTS

| | | |
|---|---|---|
| JP | 7-219946 A | 8/1995 |
| JP | 07-219946 A | 8/1995 |
| JP | 09-081549 A | 3/1997 |
| JP | 10-222516 A | 8/1998 |
| JP | 10-320390 A | 12/1998 |
| JP | 2001-142827 A | 5/2001 |
| JP | 2002-092011 A | 3/2002 |
| WO | WO 94/14122 A1 | 6/1994 |
| WO | WO 01/57611 A2 | 8/2001 |

OTHER PUBLICATIONS

Hakon Wium Lie, Bert Bos: "Cascading Style Sheets, Level 1", W3C, Dec. 17, 1996, XP002968018.

* cited by examiner

Fig.8
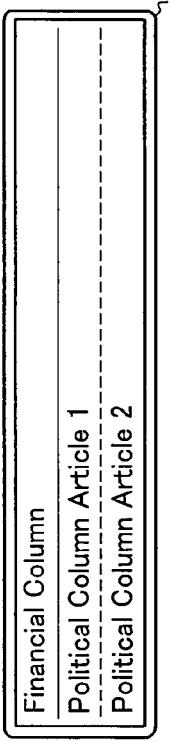
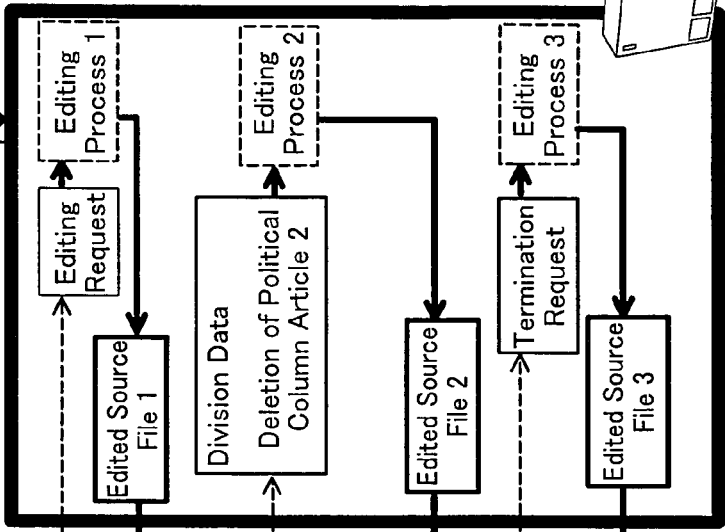
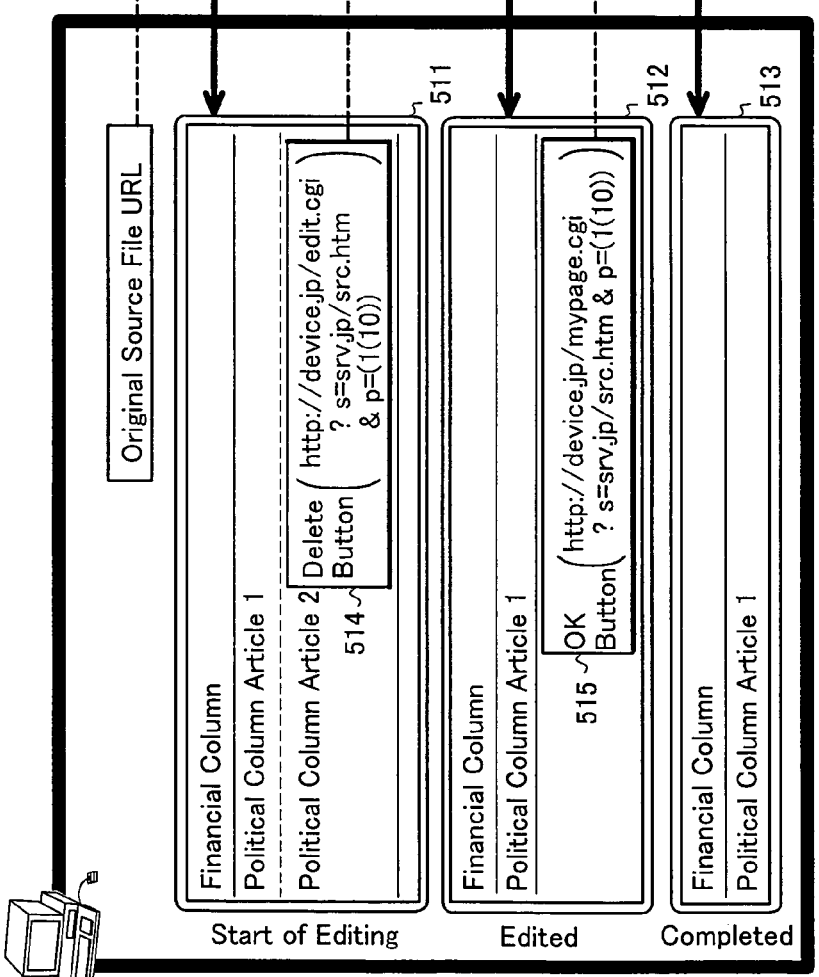

SOURCE FILE GENERATION APPARATUS

TECHNICAL FIELD

The present invention relates to a technique of simply and conveniently editing existing source files described in a markup language.

BACKGROUND ART

Vast amounts of information are provided on Web pages of the Internet. Many of the Web pages are described in a markup language, such as HTML. Source files in HTML are browsed by an application program called a browser.

Each Web page generally includes various pieces of information other than those required by the user. For browsing only required pieces of information, editing an existing source file is required. The markup language requires description according to the preset grammatical construction, so that the user without expertise of the markup language has difficulties in editing the source file.

This problem is not restricted to Web pages in HTML provided on the Internet but is commonly found in source files, which are described in various markup languages.

DISCLOSURE OF THE INVENTION

The object of the present invention is thus to eliminate the drawbacks of the prior art techniques and to provide a technique of simply and conveniently editing existing source files described in a markup language.

The invention is directed to an image output device that edits an original source file, which is described in a markup language including a preset tag, and outputs an image according to the preset tag. The image output device includes: a specification input module that inputs specification information regarding specification of an image output and source file identification data for identifying the original source file; a source file fetch module that fetches the original source file, based on the source file identification data; a division specification module that divides the original source file into divisions in a grammatical framework of the markup language and specifies an object division to be output; and an output module that outputs an image according to the specified object division.

The technique of the invention specifies an object division to be output among the divisions in the grammatical framework of the markup language. This arrangement readily and conveniently gives an image output of only a user's desired division without requiring any expertise regarding the markup language. The technique of the invention does not require any special source file for the image output but automatically edits the original source file, based on the specification information. Update of the original source file is thus reflected on the image output without any special processing.

A diversity of definitions may be applied for the divisions in the grammatical framework. For example, when the original source file is data in a tabular form, both rows and columns may be regarded as divisions.

The image output may be displayed by a liquid crystal display, a CRT, or a projector, as well as printing by a printer.

The specification information may be registered in advance in the image output device. In the case of delivery of the updated original source file at regular intervals, the image output device edits the updated original source file based on the specification information to ensure subscription in a desired output form.

In one preferable application of the image output device of the invention, the source file identification data identifies multiple original source files, and the specification information includes information regarding specification of an image output of each of the multiple original source files and data regarding a predetermined layout of the multiple original source files. The division specification module specifies the object division to be output with regard to each of the multiple original source files, and the output module outputs an image of the specified multiple object divisions in the predetermined layout.

The procedure of this application edits the multiple original source files to readily give an image output in a selected layout.

In the layout of the edited source file, the original source file may be allocated to one layout division or to multiple layout divisions.

The present invention is also directed to a source file creation device that edits an original source file, which is described in a markup language including a preset tag, to create an edited source file. The source file creation device includes: a specification input module that inputs specification information regarding an editing method and source file identification data for identifying the original source file; a source file input module that inputs the original source file, based on the source file identification data; and a creation module that edits the original source file in units of divisions in a grammatical framework of the markup language based on the specification information, so as to create the edited source file.

This arrangement readily and conveniently edits the original source file without requiring any expertise regarding the markup language.

In one preferable embodiment of the source file creation device of the invention, the original source file includes a pair of tags used together according to a grammatical rule of the markup language, and the creation module extracts a division defined by the pair of tags. This arrangement enables editing of the division defined by the pair of tags.

In another preferable embodiment of the source file creation device of the invention, the specification information includes area information for specifying a predetermined area on an image output of the original source file, and the creation module has a division specification sub-module to specify an object division to be edited, which has a preset positional relation to the specified area, among the divisions in the grammatical framework of the markup language.

This arrangement ensures intuitive editing on the image output, thus enhancing the user friendliness.

The area may be specified, for example, by a mouse drag operation, and the specified area may have any of diverse shapes, for example, a rectangular shape or a polygonal shape.

The source file creation device of the invention may have a browser for browsing a file in the markup language or may be connected with a browsing device via a network.

In still another preferable embodiment of the source file creation device of the invention, the specification information gives an instruction of dividing the original source file into the divisions in the grammatical framework, and the creation module inserts specific data representing a preset demarcation on a boundary of each of the divisions.

This structure allows the user to visually recognize the division.

The demarcation may be a horizontal line. At least part of the demarcation may be an interface used for new entry of the specification information, for example, an editing link button.

When the interface is a link button, the specification information is sent to the source file creation device in the form of a link URL assigned to the button.

The creation module creates an edited source file, where the specification information is included in each link button in the form of the link URL. The specification information includes, for example, deletion of a selected division, restoration of a deleted division, and termination of editing.

In the source file creation device of this embodiment, the specification information is used to combine consecutive areas included in the original source file, and the creation module deletes the demarcation inserted between the consecutive areas.

This arrangement changes the unit division of editing into a larger unit.

Complete analysis of the divisions may not be required, but the divisions may be analyzed sequentially to the lower hierarchy according to the requirements. This desirably relieves the processing load of the source file creation device.

In the source file creation device of the above embodiment, the specification information is used to delete a specified division included in the original source file, and the creation module invalidates the specified division.

This arrangement ensures editing to delete the user's non-required division.

Invalidation of data included in the specified division may directly exclude the specified division from the edited source file or may add a markup for comment.

In the source file creation device of the above embodiment, the specification information is used to cancel deletion of a specified division, which has once been deleted from the original source file, and the creation module obtains data included in the deleted division from the original source file or from any source file related to the original source file, and inserts the obtained data into the original source file.

This arrangement resumes the user's deleted division into the image output.

In another preferable embodiment of the source file creation device of the invention, the specification information is used to terminate editing, and the creation module generates the source file identification data for identifying the original source file and the specification information representing the editing method to obtain the edited source file from the original source file.

The source file identification data and the specification information thus generated give the user a desired image output. In a preferable example, the source file identification data and the specification information are generated as parameters of a URL. This arrangement enables these pieces of information to be readily kept and used by means of a bookmark function of the browser.

At least part of the source file identification data and the specification information may be reused for editing.

In still another preferable embodiment of the source file creation device of the invention, the source file identification data includes identification of multiple original source files, and the specification information includes information includes an editing process of the multiple original source files and data relating to a preset layout. The creation module edits each of the multiple original source files in units of the divisions in the grammatical framework of the markup language, based on the specification information and creates the edited source file according to the preset layout.

This arrangement generates the specification information to give a desired image output from the multiple original source files.

The technique of the invention is not restricted to the image output device or the source file creation device described above, but is also directed to an image output method and a source file creation method corresponding thereto. The invention is also actualized by a diversity of other applications, which include computer programs for attaining these methods, recording media in which such computer programs are recorded, and data signals that include such computer programs and are embodied in carrier waves.

Typical examples of the recording media, in which the computer programs are recorded, include flexible disks, CD-ROMs, magneto-optical disks, IC cards, ROM cartridges, punched cards, prints with barcodes and other codes printed thereon, internal storage devices (memories like RAMs and ROMs) and external storage devices of the computer, and a variety of other computer readable media.

BRIEF DESCRIPTION OF THE DRAWINGS

FIG. 8 shows the outline of processing executed in a source file editing system of a third embodiment;

BEST MODES OF CARRYING OUT THE INVENTION

Figure 1:
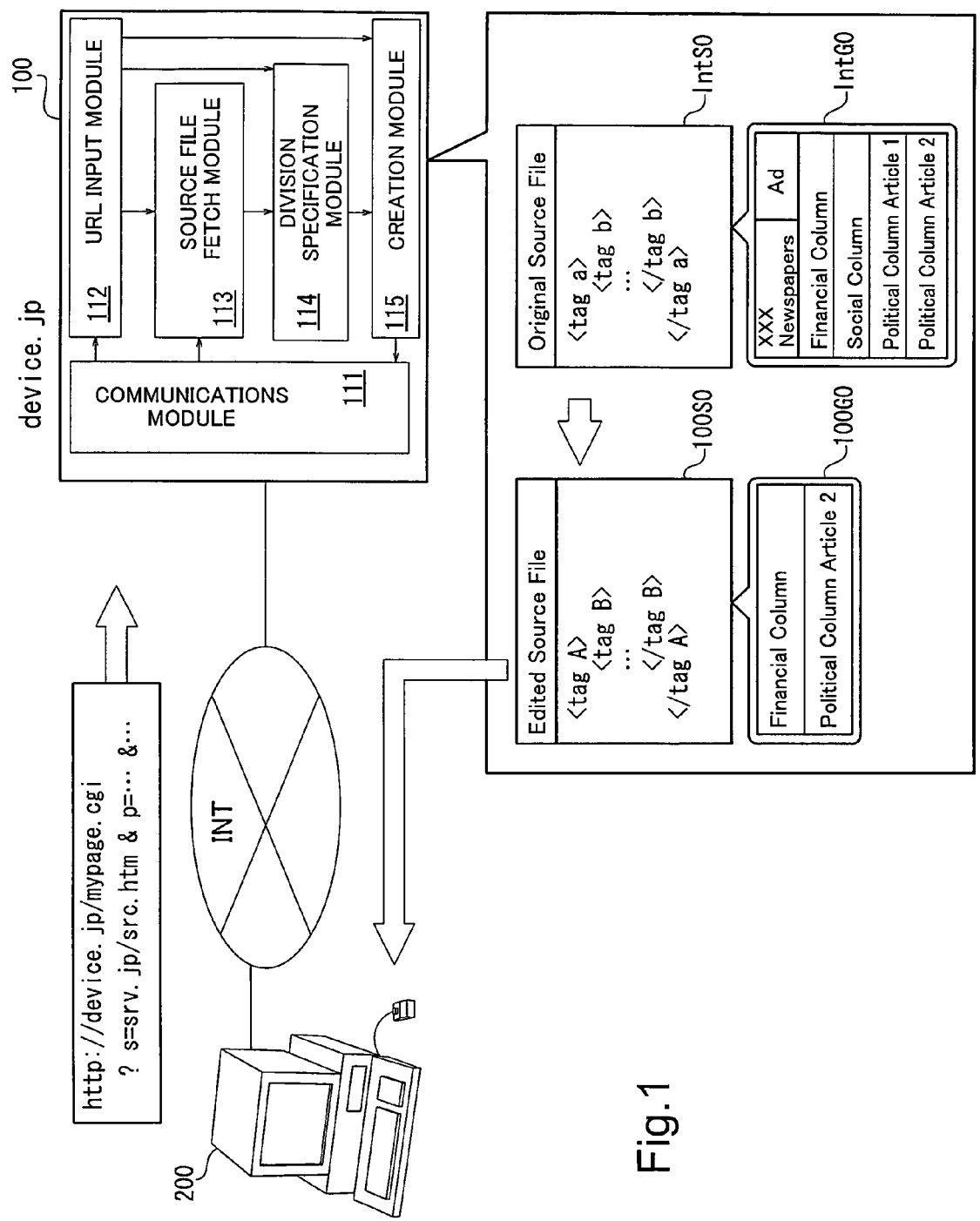
FIG. 1 illustrates the general construction of a source file editing system.

Some modes of carrying out the invention are discussed below as preferred embodiments in the following sequence:
A. Source File Editing System
  A1. System Construction and Module Configuration
  A2. Edited Source File Creation Process
  A3. Source File
    A3-1. Markup Language
    A3-2. Division in Nested Structure
  A4. Editing Process
B. Second Embodiment
C. Third Embodiment
  C1. System Construction
  C2. Generation of Division Data C3. Completion of Division Data
C4. Creation of Source File
D. Fourth Embodiment
E. Fifth Embodiment A. Source File Editing System A1. System Construction and Module Configuration FIG. 1 illustrates the general construction of a source file editing system. This system edits a user's selected Web page according to the user's specification and outputs the edited Web page. The source file editing system includes an editing server 100 and a client 200, which are both connected to the Internet INT.

The Internet INT may be replaced by another wide area network or a restricted network like an intranet or a local area network. The editing server 100 may be constructed as a gateway or a proxy server to connect the client 200 to the Internet. In this case, the editing server 100 is connected with the Internet and is linked with the client 200 locally or via a LAN.

A browser, that is, application software used to browse source files described in a markup language including preset tags, is installed in the client 200. The user of the client 200 gives specifications of a desired Web page to be browsed and an editing method for browsing to the editing server 100 via the browser. This embodiment uses URL (Uniform Resource Locator) to give all such specifications.

The editing server 100 fetches an original source file of a selected Web page from a Web server on the Internet INT, base on each URL received from the client 200. The editing server 100 then edits the fetched original source file according to the user's specified details and thereby creates an edited source file, which is to be browsed on the client 200. For convenience of explanation, a domain name 'device.jp' is allocated to the editing server 100.

The illustration includes a URL transmitted from the client 200. The configuration of this embodiment utilizes CGI (Common Gateway Interface), such as Perl, so that the URL follows the CGI protocol. The URL includes a protocol identifier 'http', a domain name 'device.jp', and a CGI script name to be executed 'mypage.cgi'. In the structure of this embodiment, CGI scripts are provided individually corresponding to types of processing executed by the editing server 100. The CGI script name may thus be referred to as processing type data for identifying the type of processing executed by the editing server 100. Data following a delimiter '?' is argument data representing the argument of the CGI script. The argument data may include multiple pieces of information with a character '&' as delimiters.

The argument data in the illustrated example includes source file identification data and division data. The source file identification data identifies an original source file ('s=srv.jp/src.htm' in the illustrated example of FIG. 1). The division data specifies an editing method of the original source file, especially a dividing method into divisions on a grammatical framework of the markup language ('p=. . .' in the illustrated example of FIG. 1).

The editing server 100 receives a URL, fetches an original source file based on the argument data in the URL, and edits the fetched original source file to create an edited source file. The user browses a desired edited Web page, based on the edited source file.

FIG. 1 also shows the module configuration of the editing server 100 for editing. In the structure of this embodiment, the respective modules are attained by the software configuration as computer programs installed in the editing server 100. These modules may alternatively be actualized by the hardware configuration.

A URL input module 112 receives a URL transmitted from the client 200. A source file fetch module 113 fetches an original source file, based on the source file identification data included in the URL. A division specification module 114 analyzes the syntax of the fetched original source file based on the division data included in the URL and defines divisions as units of editing. A creation module 115 edits the original source file in units of divisions and creates an edited source file. A communications module 111 takes charge of communications via the Internet INT.

The edited source file is output by the browser of the client 200. The illustration also includes an example of editing by the editing server 100.

In the illustrated example, an image output IntG0 based on an original source file IntS0 includes several columns, that is, a financial column, a social column, a political column article 1, and a political column article 2. The political column article 1 and the political column article 2 constitute a political column. Each column corresponds to a division defined by a pair of tags like 'tag a' and '/tag a'. The tags may have a nested structure. The nested structure causes the divisions, the political column article 1 and the political column article 2, to be included in a larger division, the political column.

The editing server 100 extracts part of the original source file in units of divisions based on the division data and creates an edited source file 100S0. In the illustrated example, as shown by an image output 100G0, the editing server 100 extracts the financial column and the political column article 2 to create the edited source file 100S0.

Figure 2:
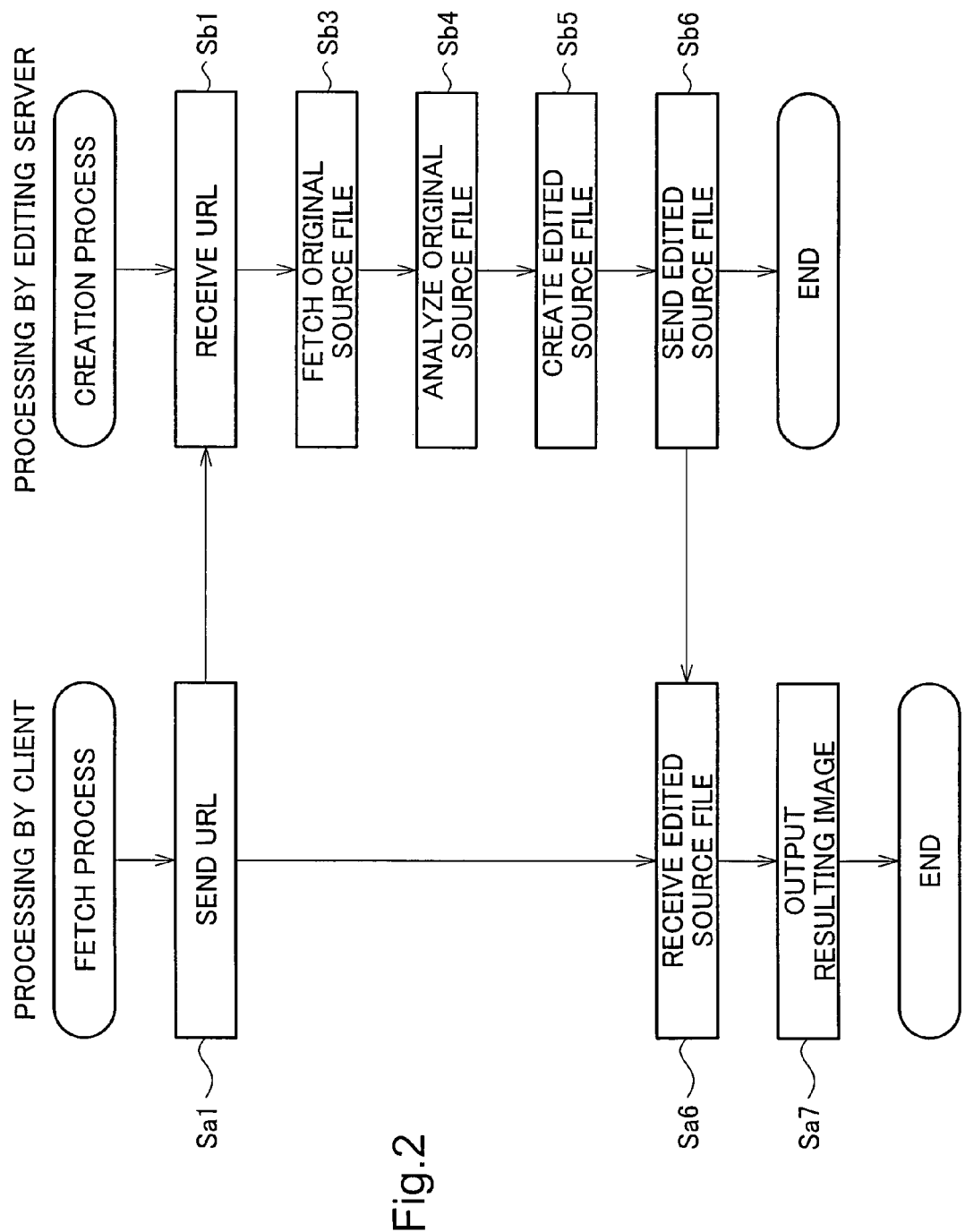
FIG. 2 is a flowchart showing an edited source file creation process.

A2. Edited Source File Creation Process FIG. 2 is a flowchart showing an edited source file creation process. The right flow shows a series of processing executed by the editing server 100, and the left flow shows a series of processing executed by the client 200.

The client 200 sends a URL by HTTP (Hypertext Transfer Protocol) at step Sa1. The URL includes source file identification data for identifying an original source file as an object to be browsed and division data for specifying the details of editing.

The editing server 100 receives the URL from the client 200 at step Sb1, and fetches an original source file based on the source file identification data included in the URL at step Sb3. The editing server 100 then analyzes the syntax with tags included in the fetched original source file, defines divisions as units of editing, and specifies an object division to be output based on the division data at step Sb4. The editing server 100 subsequently extracts the specified object division to create an edited source file at step Sb5 and sends the edited source file to the client 200 at step Sb6.

The client 200 receives the edited source file at step Sa6 and outputs a resulting image based on the edited source file at step Sa7.

A3. Source File

A3-1. Markup Language

The markup language marks up data, for example, document data, with tags delimited by characters '<' and '>'. Each source file described in the markup language accordingly includes contents data and tags. Typical examples of the markup language include HTML (Hypertext Markup Language), MathML, XHTML, SMIL, LaTeX, as well as meta-markup languages like SGML (Standard Generalized Markup Language) and XML (Extensible Markup Language). In the description below, tags of HTML are adopted. As a matter of convenience, part of the details existing on the original grammatical framework of HTML may be omitted from the source file in the following description.

A3-2. Division in Nested Structure

Each element in the source file includes a start tag, contents data, and an end tag. The start tag and the end tag are necessarily used as a pair. When the element does not have any contents data, one vacant element tag may be used instead of the combination of the start tag and the end tag.

The start tag and the end tag in HTML are used in the form of the start tag <name> and the end tag </name>. An example of the <name> is <table> representing tabular output. An example of the vacant element tag is <HR> tag representing insertion of a delimiting line.

Elements may be nested to have a hierarchical structure. Namely a certain element may be included in another element.

```
<P0>
  <PT1>T1</PT1>
  <PT2>T2</PT2>
</P0>
```

For example, the above description in an HTML source file shows a hierarchical structure, in which an element <P0>-</P0> includes a T1-containing element <PT1>T1</PT1> and a T2-containing element <PT2>T2</PT2>.

In this manner, the HTML source file has the syntax specified by tags. The editing server 100 analyzes this syntax to define divisions as units of editing. The divisions may be, for example, an element specified by combination of a start tag and an end tag, a vacant element, and contents data delimited by either the element or the vacant element. The divisions may also have the nested structure.

Figure 3:
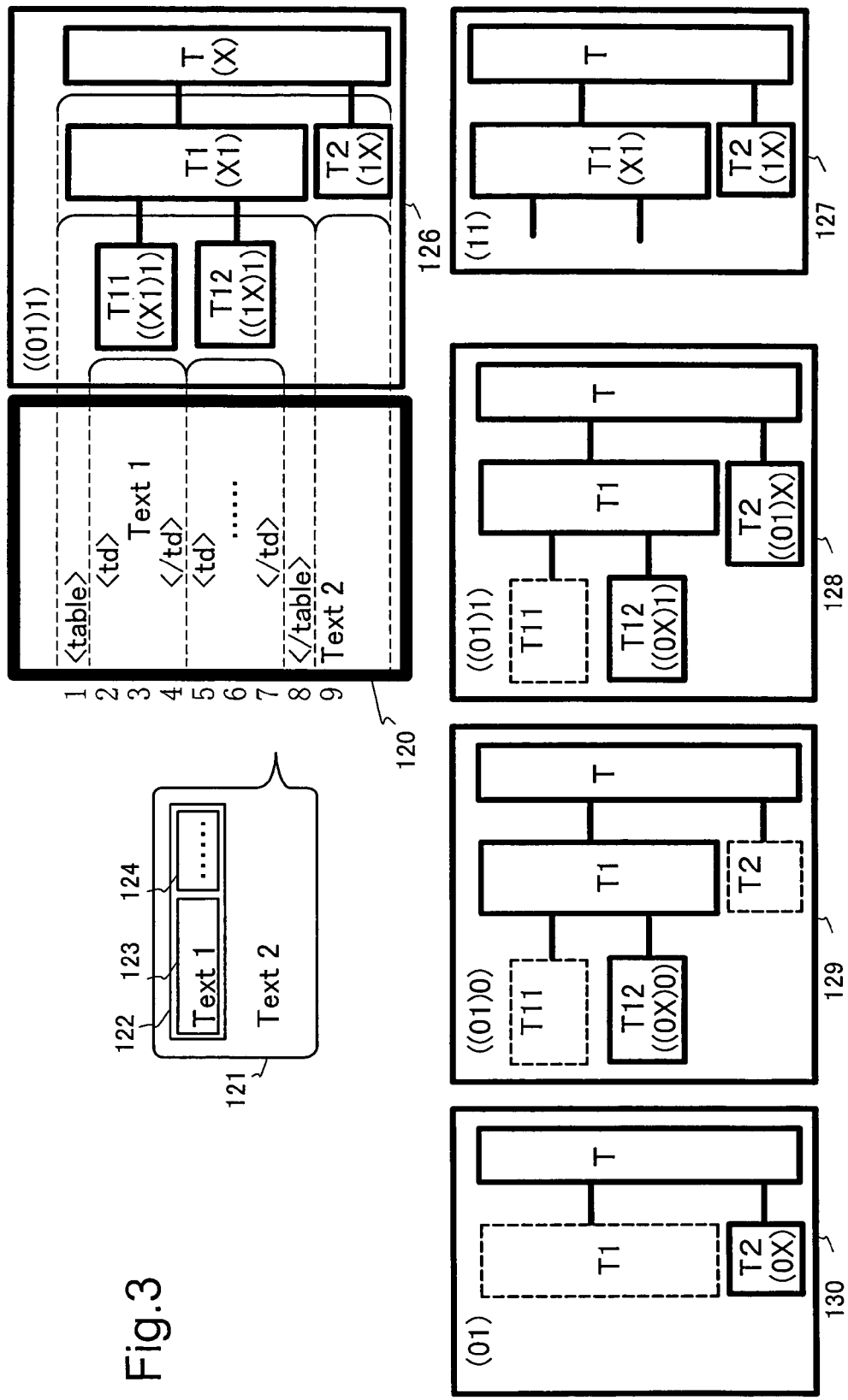
FIG. 3 shows a structure of a source file.

FIG. 3 shows a structure of a source file. A source file 120 has elements in a nested structure. The illustration also includes an image 121 output by the browser, based on the source file 120. A structural diagram 126 conceptually shows the nested structure of the source file 120. The image 121 and the structural diagram 126 correspond to data structure determined by structural analysis of the source file 120 by the editing server 100.

A division of line 1 to line 8 delimited by <table> and </table> in the source file 120 corresponds to a table 122 included in the image 121 and to a division T1 included in the structural diagram 126.

A division of line 2 to line 4 and a division of line 5 to line 7 respectively delimited by <td> and </td> correspond to a column 123 and a column 124 in the image 121 and to divisions T11 and T12 in the structural diagram 126.

An element 'text 2' on line 9 in the source file 120 corresponds to 'text 2' in the image 121 and to a division T2 in the structural diagram 126.

The original grammatical framework of HTML requires combination of a start tag <tr> and an end tag </tr> to delimit data representing rows in the table. In this illustrated example, the table has rows included in the divisions T11 and T12. In the original grammatical framework, the start tag <tr> and the end tag </tr> are to be inserted respectively between lines 1 and 2 and between lines 7 and 8 to specify row data representing lines 2 to 7. For convenience of explanation, these tags are omitted from the illustration of the source file 120.

In the source file 120, the two divisions T11 and T12 are nested in the division T1. This nested structure is expressed in the image 121 by inclusion of the columns 123 and 124 in the table 122.

In the description below, each element included in one division is called a branch division. The respective divisions may have or may not have branch divisions. Each division without any branch division is called a leaf division. Multiple branch divisions included in one division are sequenced from the top of the source file.

When one division is included in another division, each nearest outer division is called a trunk division. Any division except a root division has one trunk division at most. The root division corresponds to the main body of a document, and each document has only one root division. In the structural diagram 126, a division T corresponds to the root division.

The following description is based on the structural diagram 126 of FIG. 3, which is obtained as the result of structural analysis of the source file 120. The division T has two branch divisions, the divisions T1 and T2. The division T1 further has two branch divisions, the divisions T11 and T12.

The editing server 100 divides each source file into multiple divisions and edits the source file in units of divisions. The division data included in the URL specifies the dividing method into divisions. The division data may follow any format, as long as editing in units of divisions is specifiable. This embodiment takes advantage of the nested structure and adopts simple specification of the dividing method with symbols like 0, 1, and X. The contents of the division data in this embodiment are described in due order.

Structural diagrams 127 to 130 respectively show intermediate nested structures. Unlike the original nested structure, the intermediate nested structure regards arbitrary branch divisions as leaf divisions. Branch divisions actually included in those regarded as leaf divisions are neglected. For example, the structural diagram 127 shows the intermediate nested structure, in which the division T1 is selected as a leaf division and its branch divisions T11 and T12 are neglected.

The technique of this embodiment utilizes these intermediate nested structures to compose the division data. The division data is a character string including characters '0', '1', and 'X' and pairs of brackets '(' and ')'. Here the character '0' represents no selection of a certain division as an object to be output. The character '1', on the other hand, represents selection of a certain division as the object to be output. The character 'X' represents specification of a certain division as a partition object. The positions of these characters mapped to the nested structure are specified by the brackets '(' and ')'.

The outer most division T is defined by a pair of brackets '(' and ')'. The characters representing the respective branch divisions are then entered in the brackets. The intermediate nested structure 127, in which only the branch divisions T1 and T2 are included in the division T, is expressed by division data '(11)'. The left character '1' represents the branch division T1, and the right character '1' represents the branch division T2. Division data '(01)' expresses the structural diagram 130, in which the branch division T1 is not selected as the object to be output.

The branch division T1 further includes the leaf divisions T11 and T12. This nested structure is expressible by the same principle as the intermediate nested structure described above. As shown in the structural diagram 126, the branch division T1 is expressed by a pair of brackets '( )' and the characters representing the leaf divisions T11 and T12 are entered in the brackets. Division data '((01)1)' shown in the structural diagram 126 means that the leaf division T11 is not selected as the object to be output while the leaf division T12 and the branch division T2 are selected as the object to be output.

Division data '(11 . . . 1)' expressing a certain division shows that all branch divisions included in the certain division are selected as the object to be output. In this case, dividing the certain division into branch divisions is meaningless, and the certain division as a whole is to be selected as the object to be output. Namely the character string '(11 . . . 1)' is replaceable by the character '1'. Similarly a character sting '(00 . . . 0)' is replaceable by the character '0'.

Based on the principle discussed above, the division data may specify each division as the partition object, among the divisions of the nested structure. In this case, the character '0' or '1' is replaced by the character 'X'.

For example, as shown in the structural diagram 126, the division T and the branch divisions T1 and T2 are respectively expressed by division data '(X)', '(X1)', and '(1X)'. When the presence of the leaf divisions T11 and T12 is counted, the leaf division T12 and the branch division T2 are respectively expressed by, for example, division data '((0X)1)' and '((01)X)', as shown in the structural diagrams 128 and 129. In this case, the characters '1' and '0' represent selection and non-selection of a division, other than the division specified as the partition object, as the object to be output.

Figure 4:
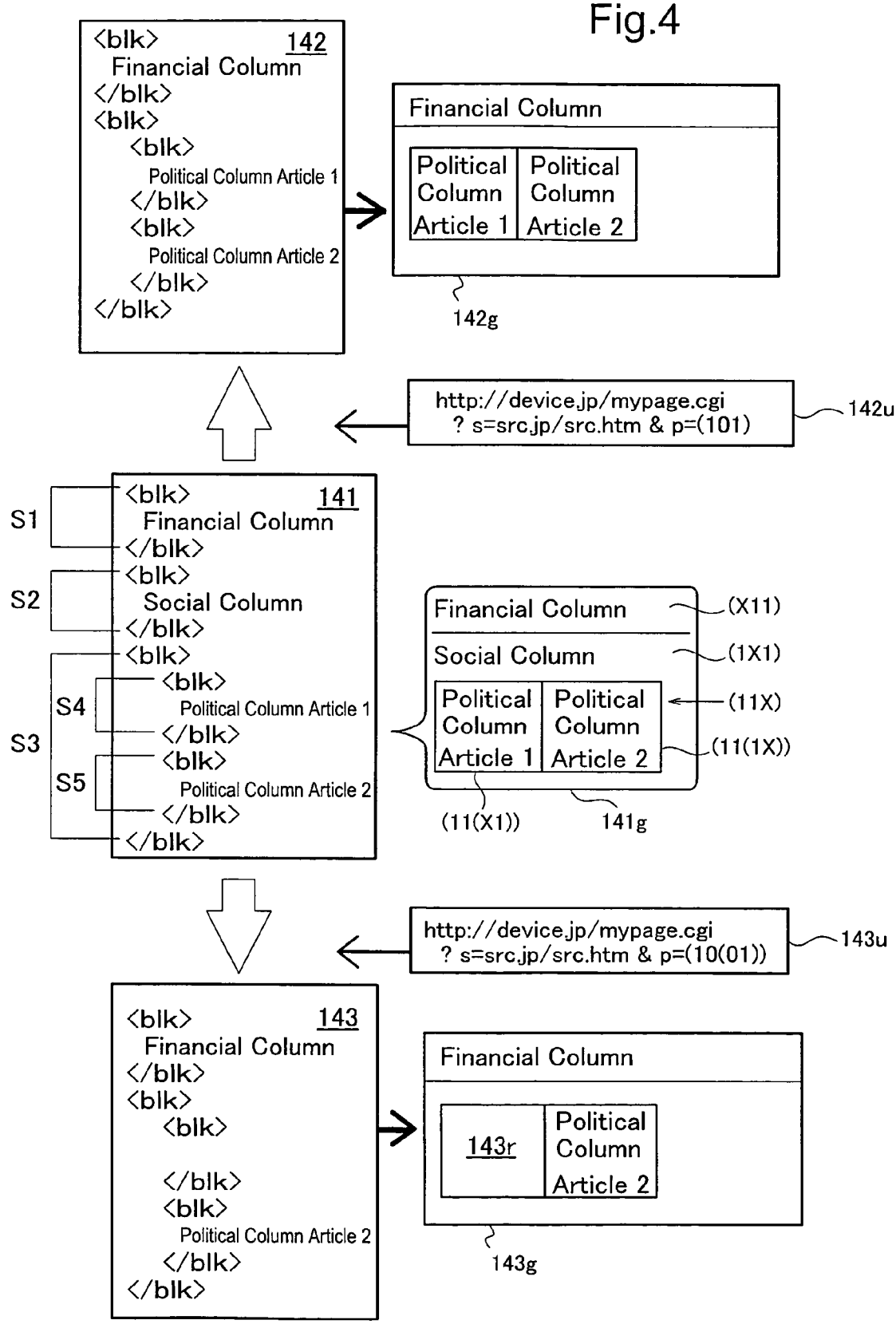
FIG. 4 shows examples of edited source file created.

FIG. 4 shows examples of edited source file created. In this illustrated example, a source file includes only a start tag '<blk>' and an end tag '</blk>'. An original source file 141 has a division S1 of a financial column, a division S2 of a social column, and a division S3 of a political column respectively delimited by these tags. The political column is a table and has nested structure including a division S4 of a political column article 1 and a division S5 of a political column article 2.

The respective divisions of the original source file 141 are expressed as shown in an image output 141g. According to the principle discussed above with reference to FIG. 3, the division S1 of the financial column is expressed as '(X11)', the division S2 of the social column as '(1X1)', and the division S3 of the political column as '(11X)'. The division S4 of the political column article 1 and the division S5 of the political column article 2 are respectively expressed as '(11(X1))' and '(11(1X)'.

In one example, the browser sends a URL 142u to the editing server 100. This URL 142u includes a CGI script, source file identification data, and division data. In the illustrated example, the source file identification data is 's=src.jp/src.htm' and the division data is 'p=(101)'. According to the division structure, the character '0' is mapped to the social column. This division data accordingly means that the social column is excluded from the object to be output.

An edited source file 142 is obtained a result of editing, based on the division data included in the URL 142u. Deletion of the social column from the original source file 141 results in the edited source file 142. An image output 142g excluding the social column is given according to the edited source file 142.

In another example, the browser sends a URL 143u to the editing server 100. The division data included in this URL 143u is 'p=(10(01))'. According to the division structure, the character '0' is mapped to the social column and the article 1. This division data accordingly means that both the social column and the article 1 are excluded from the object to be output.

An edited source file 143 is obtained as a result of editing, based on the division data included in the URL 143u. Deletion of the social column and the article 1 from the original source file 141 results in the edited source file 143. An image output 143g excluding the social column and the article 1 is given according to the edited source file 143.

Additional processing is desirable to adjust the format of the image output in the course of deletion of some articles. For example, only the contents of the 'political column article 1' are deleted from the edited source file 143, while the start tag '<blk>' and the end tag '</blk>' remain. An area corresponding to the article 1 is accordingly left as a blank column 143r in the image output 143g. In this case, attribute data (for example, size specification data for specifying the dimensions of a blank column) may be added to leave an appropriate size of the blank column.

Retention or elimination of the blank column may be set arbitrarily. Deletion of the start tag and the end tag eliminates the blank column 143r. In this case, the display position of the article 2 is moved by elimination of the blank column 143r. The preferable procedure carries out the editing process including insertion and deletion of supplementary data to ensure the favorable image output.

A4. Editing Process

Figure 5:
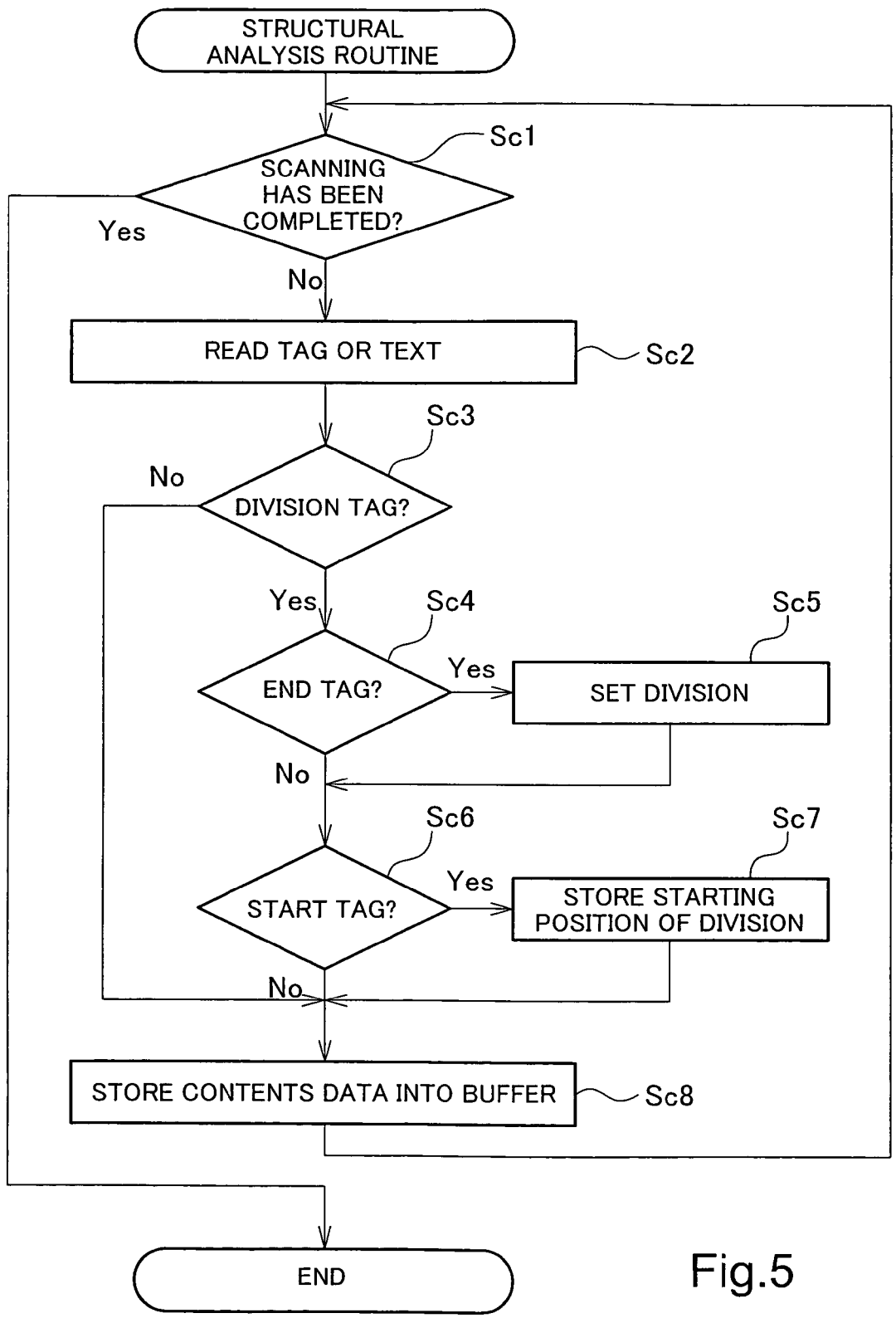
FIG. 5 is a flowchart showing a structural analysis routine.

FIG. 5 is a flowchart showing a structural analysis routine. The editing server 100 sequentially scans a source file from its top and thereby analyzes the structure of the source file according to this flowchart.

At step Sc1, the editing server 100 determines whether scanning of a source file has been completed. When it is determined that scanning has already been completed, the program immediately exits from the structural analysis routine. When it is determined that scanning has not been completed yet, on the other hand, the program goes to processing of and after step Sc2 to effectuate structural analysis.

At step Sc2, the editing server 100 reads character string data representing a tag or a text. It is then determined at step Sc3 whether the input data represents a tag for specifying delimitation of a division (hereafter referred to as 'division tag'). An example of the division tag is '<hr>' for outputting horizontal lines. This tag indicates both the end of one division of preceding data and the start of a next division of subsequent data.

In the case of the division tag, when it is determined at step Sc4 that the division tag represents the end of a division (hereafter referred to as the 'end tag'), settings of the division are finally settled at step Sc5. Namely this step sets the starting point and the end point of a division in the source file and stores the settings. When it is determined at step Sc6 that the division tag represents the start of a division (hereafter referred to as the 'start tag'), the starting position of the division is stored at step Sc7. The source file may have the nested structure, so that the start of another division may come earlier than the end of one division.

The contents data are stored into a buffer at step Sc8. When the contents data specify the location of substantial data to be output by, for example, a URL, the procedure fetches the substantial data from the specified location. When the substantial data is image data, the resolution is converted according to the requirements. The processing of step Sc8 is also carried out when it is determined at step Sc3 that the input data is not any division tag.

The division tag may function as both the end tag and the start tag, like the tag '<hr>' for outputting horizontal lines. The division tag may include information as the contents data. One example of such a division tag is '<img src="src.jpg">' for display of an image in HTML. The procedure of this embodiment accordingly carries out the processing of steps Sc6 to Sc8 for the end tag and the processing of step Sc8 for the start tag.

Figure 6:
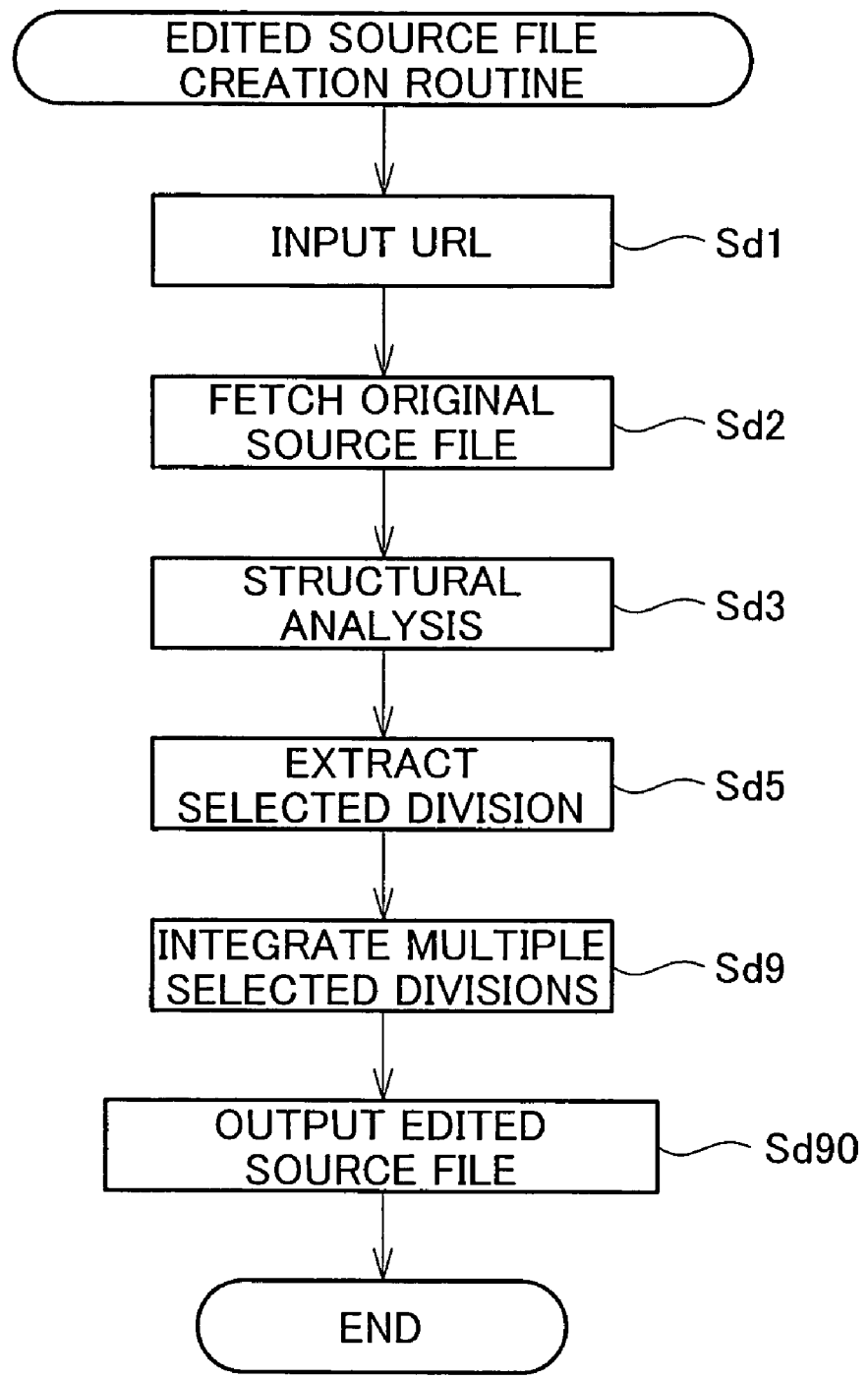
FIG. 6 is a flowchart showing an edited source file creation routine.

FIG. 6 is a flowchart showing an edited source file creation routine. The editing server 100 edits an original source file and creates an edited source file according to this edited source file creation routine.

The procedure inputs a URL at step Sd1. The input URL includes source file identification data and division data. The procedure then fetches an original source file, based on the source file identification data at step Sd2.

The procedure subsequently analyzes the fetched original source file according to the division data and defines divisions as units of editing at step Sd3. The structural analysis follows the series of processing shown in FIG. 5.

The procedure extracts a division as an object to be output (hereafter referred to as 'selected division') according to the division data at step Sd5, and integrates multiple selected divisions thus extracted to create an edited source file at step Sd9. The edited source file is set to the client at step Sd90.

The original source file may include data representing its divisions and structure.

The results of previous structural analysis and the results of previous editing may be reused for creation of a new edited source file. For example, when the original source file and the division data are identical with those specified in a previous cycle of this processing, the whole or part of an existing edited source file created in the previous cycle may be reused for creation of a new edited source file.

The system of this embodiment gives image output including only the user's desired division extracted from the original source file described in the markup language. Even when the contents of the original source file are updated, similar editing results are readily obtained as long as the division structure is maintained.

B. Second Embodiment

Figure 7:
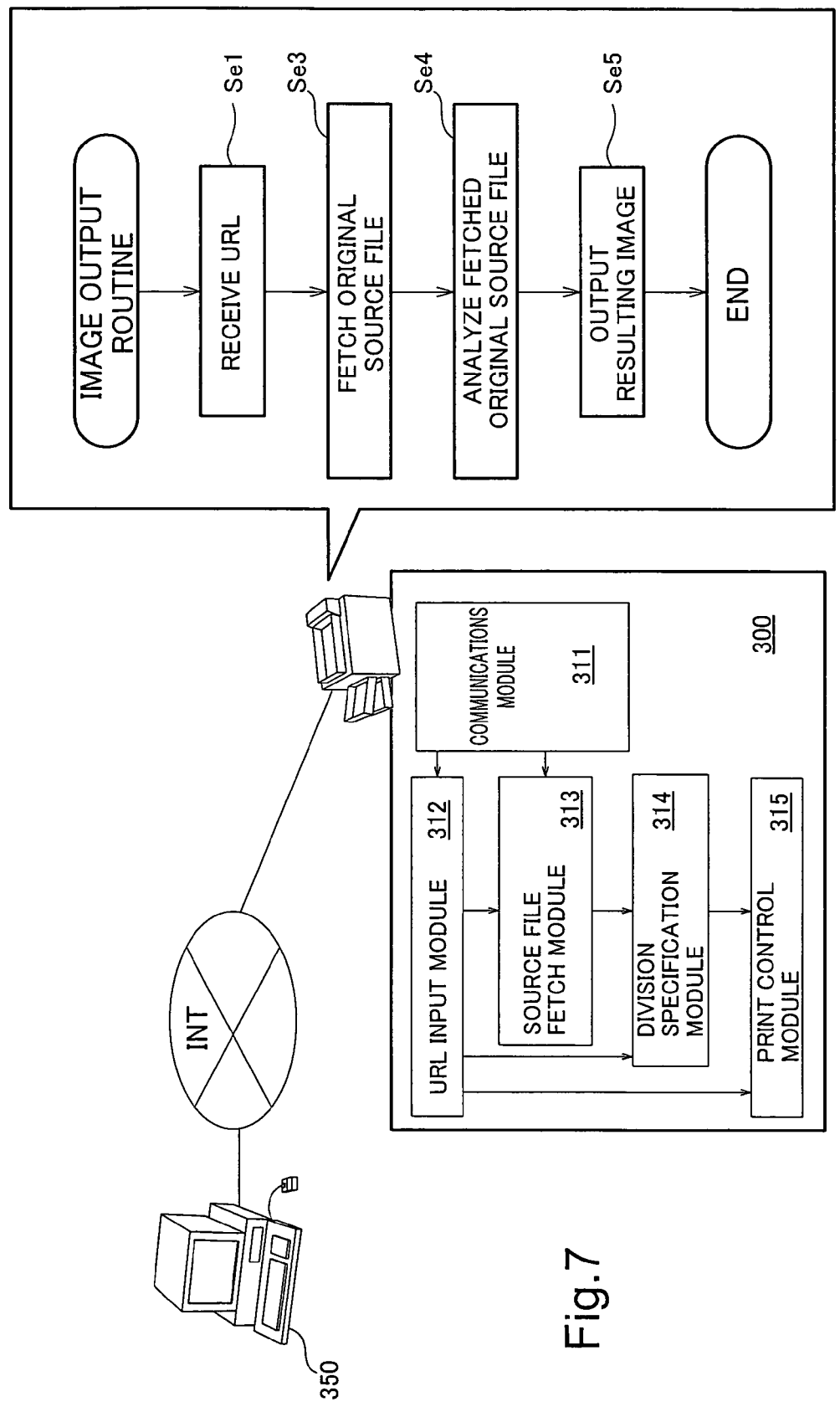
FIG. 7 illustrates the general construction of a source file editing system in a second embodiment.

FIG. 7 illustrates the general construction of a source file editing system in a second embodiment. In the configuration of the second embodiment, a printer functioning as an editing output device 300 receives specification data from a client 350, fetches an original source file, and edits the fetched original source file to create an edited source file. The editing output device 300 also gives a print output based on the edited source file. The client 350 and the editing output device 300 are mutually connected via the Internet INT in the configuration of the second embodiment, although they may be connected locally or via a LAN.

The illustration also shows modules included in the editing output device 300. Several modules have the similar functions to those of the first embodiment: a communications module 311, a URL input module 312, a source file fetch module 313, and a division specification module 314. The structure of the second embodiment additionally has a print control module 315 that implements printing based on the edited source file.

The illustration also includes a flowchart of an image output routine executed by the editing output device 300. Like the series of processing executed by the editing server 100 in the first embodiment, the image output routine receives a URL (step Se1), fetches an original source file (step Se2), analyzes the fetched original source file (step Se3), and outputs a resulting image (step Se4). The primary difference from the first embodiment is that the processing of the second embodiment outputs the image in the form of a print. The user can thus readily obtain desired prints.

The structure of the second embodiment may be modified according to the requirements.

The division data for specifying the editing process of an original source file may be included in the original source file itself described in the markup language, instead of inclusion in the URL. For example, an original source file including division data in the form of comments may be sent directly to the editing output device 300.

The editing output device 300 may be constructed to output prints at regular intervals as newspaper distribution. The print may otherwise be output after determination of whether the original source file has been updated.

C. Third Embodiment

C1. System Construction

FIG. 8 shows the outline of processing executed in a source file editing system of a third embodiment. The source file editing system of the third embodiment includes a client 500 and an editing server 400. The configuration of modules in the editing server 400 is identical with that in the editing server 100 of the first embodiment. The primary difference from the first embodiment is that the editing server 400 carries out supplementary processing for generation of division data, in addition to the series of processing executed by the editing server 100 of the first embodiment.

The client 500 has a browser installed therein and specifies the editing process of an original source file on a window open on the browser. As described previously, division data for specifying the editing process is generated as a parameter of a URL. The bookmark function is utilized to keep the URL for repeated execution of the same editing process. The client 500 may have an additional function of sending the URL to the editing output device 300.

The client 500 sends specification data including a URL for identifying an original source file 510 to the editing server 400 and gives an editing start instruction. The editing server 400 creates an edited source file 1 from the original source file 510 based on the specification data to give an editing request, and provides an image output 511.

In an editing process 1, the editing server 400 fetches the original source file 510 and adds supplementary data for output of buttons to effectuate editing in units of divisions to create an edited source file. The supplementary data may give a specific output for the user's visual recognition of the respective divisions, for example, horizontal lines. The supplementary data also give an OK button representing the completion of editing.

The user utilizes the image output 511 of the edited source file and starts editing. Here the editing means a series of operations to edit the image output and generate division data.

The image output 511 includes an Edit button 514, which is, for example, a Delete button to delete a division corresponding to a political column article 2. The Edit button is a link to a file identified by a URL accompanied with the Edit button and functions as a Shift button to the corresponding image output. In the structure of this embodiment, the URL corresponding to the processing specification of the Edit button is given as the link information.

The user clicks the Edit button 514 to effectuate the processing of the political column article 2. The Edit button 514 is the Delete button in this embodiment. A click of the Delete button sends division data for deletion of a corresponding division in the form of a URL to the editing server 400. The editing server 400 accordingly creates an edited source file 2 (according to an editing process 2 in FIG. 8). The click of the Edit button 514 deletes the division corresponding to the political column article 2 as shown in an image output 512.

The user leaves only output of a desired division, while deleting the other divisions, thus obtaining a desired image output.

The user who is content with selection of a desired division in the image output 512 terminates editing according to the following procedure. The image output 512 has an OK button 515. A click of the OK button 515 gives a resulting image output 513, which excludes non-required display of editing-related buttons. The OK button 515 is an interface to give an instruction of deleting these editing-related buttons in the form of a URL to the editing server 400.

In response to the click of the OK button, the editing server 400 goes to an editing process 3 to create an edited source file 3 excluding the Edit button and the OK button.

The user receives the edited source file 3 to display the image output 513. A URL corresponding to the edited source file 3 is displayed on the browser. The URL functions as division data, which enables the editing server 400 to recreate the edited source file 3 from the original source file.

The procedure of this embodiment utilizes the equivalent division data for the equivalent image output, with that of the first embodiment. Namely the specification data sent in response to the clicks of the Edit button and the OK button includes division selection (expansion) data. The specification data used for the image output in respective editing stages is similar to that used in the first embodiment, except that specification of the CGI script as processing type data is regarded as an editing script. This is, however, for simplicity of explanation, and the procedure of this embodiment may use division specification data as described later.

C2. Generation of Division Data

Figure 9:
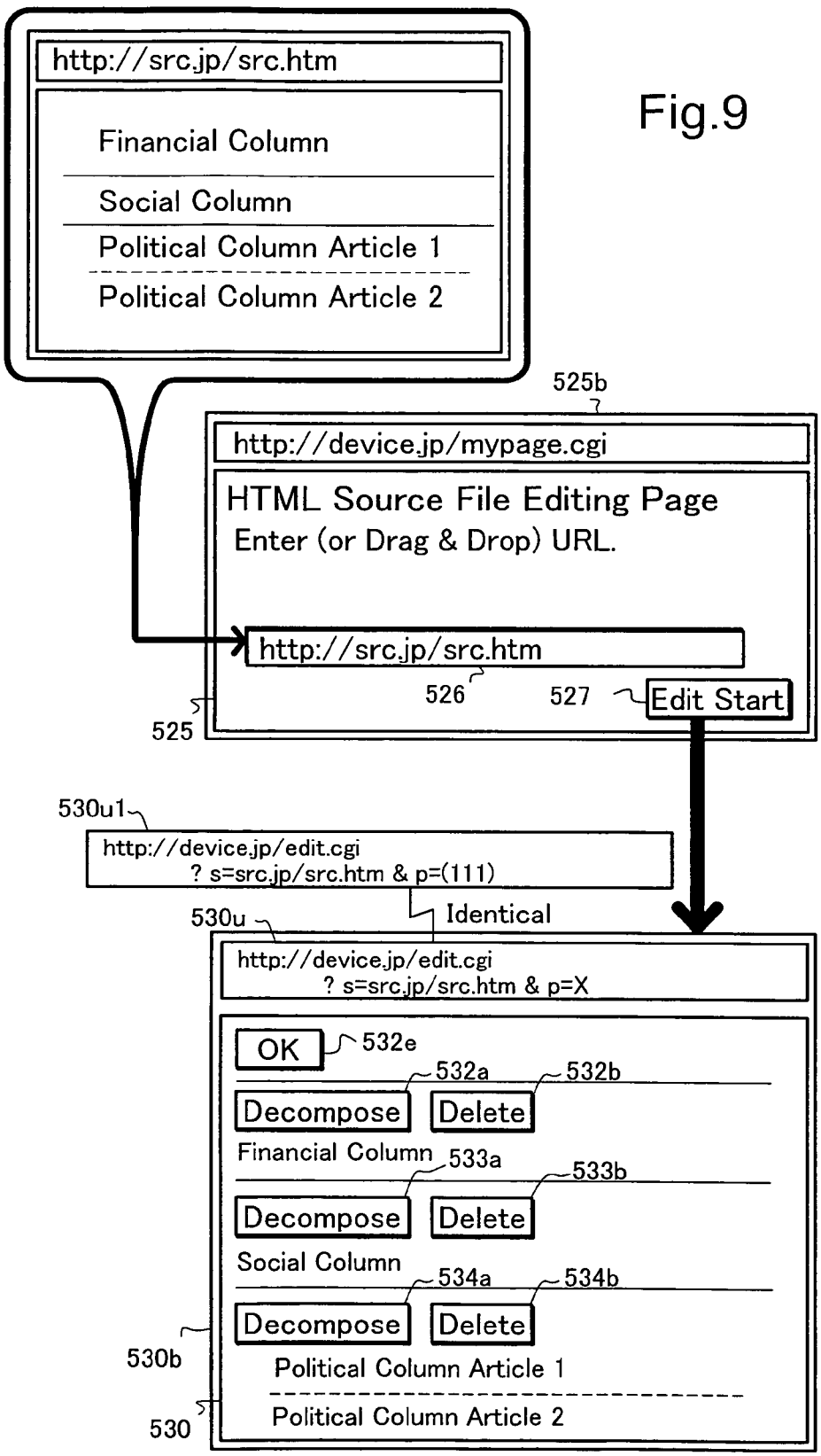
FIG. 9 shows an interface to generate division data.

FIG. 9 shows an interface to generate division data. In this illustrated example, an original source file has a URL 'http://src.jp/src.htm'.

An image output 525b shows an interface to input the URL of the original source file and start generation of specification data. The URL of the original source file is entered in a URL input box 526. The URL of the original source file may be input by dragging and dropping a display of the URL in the original source file.

A click of an Edit Start button 527 sends an editing request to the editing server 400, which accordingly displays an image output 530 for editing. A URL sent by the click of the Edit Start button 527 is shown in a URL display box 530u. This URL includes CGI script specification data 'edit.cgi' for additional processing, such as addition of editing-related buttons, source file identification data 's=src.jp/src.htm', and division data 'p=X'. The division data 'p=X' functions to divide the original source file and display the respective divisions. In this original source file, the division data 'p=X' has the equivalent meaning to 'p=(111) (see URL 530u1).

The editing server 400 receives the division data and substitutes 'p=(111)' for the received division data 'p=X', based on the analysis of the original source file. Synchronously with this substitution, the display in the URL display box 530u may be changed automatically to a URL 530u1.

The editing server 400 creates an edited source file to output an editing image, based on the division data. The editing image includes editing-related buttons and horizontal tags for the user's visual recognition of multiple divisions.

An image output 530 shows an example of editing image. In this illustrated example, the editing-related buttons include Decomposition buttons 532a, 533a, and 534a, Delete buttons 532b, 533b, and 534b, and an OK button 532e.

Figure 10:
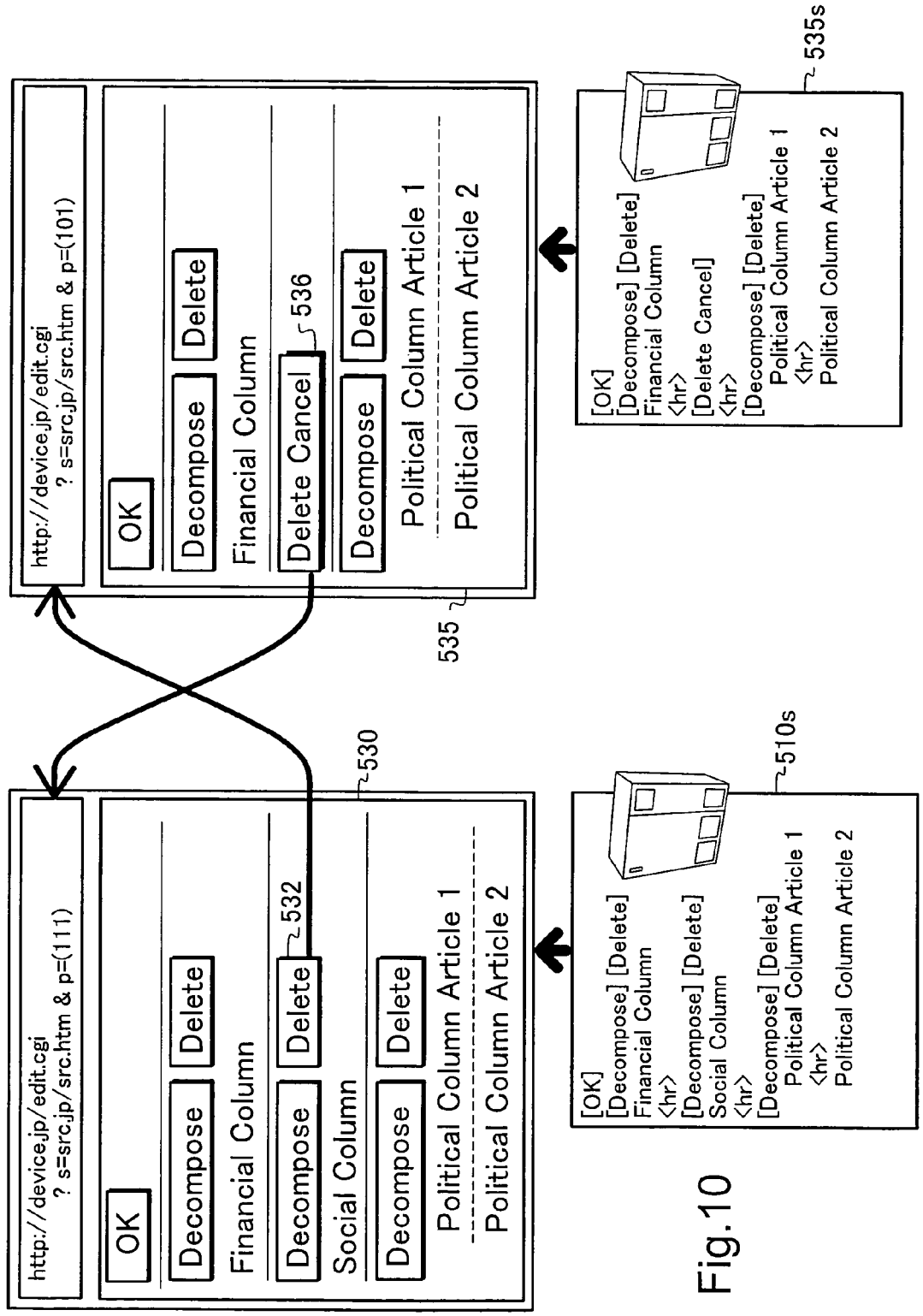
FIG. 10 shows an interface to delete a division or to cancel such deletion.

FIG. 10 shows an interface to delete a division or to cancel such deletion. The image output 530 on the left side of FIG. 10 is identical with the image output 530 shown in FIG. 9. A Delete button 532 in the social column is clicked to delete the corresponding division with the button from a resulting image output. The Delete button 532 functions as an interface to send a URL including division data 'p=(101)' as shown in a URL display box in an image output 535. The click of the Delete button 532 gives the image output 535 excluding the social column as shown on the right side of FIG. 10.

The image output 535 has a Delete Cancel button 536 at the position of the deleted social column. The Delete Cancel button 536 functions as an interface to send a URL including division data 'p=(111)' as shown in the image output 530. The click of the Delete Cancel button 536 resumes the image output 530 before deletion.

Diverse methods may be applicable to cancel the deletion. The first applicable method of canceling deletion recreates the image output 530 from the original source file. The second applicable method does not actually delete a selected division to be deleted from the source file but only invalidates the selected division with a comment. The comment may be eliminated, in response to an instruction of delete cancellation.

FIG. 10 shows both an edited source file 530s corresponding to the image output 530 and an edited source file 535s corresponding to the image output 535. Here [Decompose] represents data for providing a Decompose button, and [Delete], [OK], and [Delete Cancel] respectively represent the corresponding buttons. Data inserted into the source file to provide the corresponding buttons will be discussed later in detail.

The respective buttons included in the image output 535 may have different link data from those of the corresponding buttons in the image output 530. This is because the link data mapped to the buttons in the image output 535 include information to exclude the social column.

Figure 11:
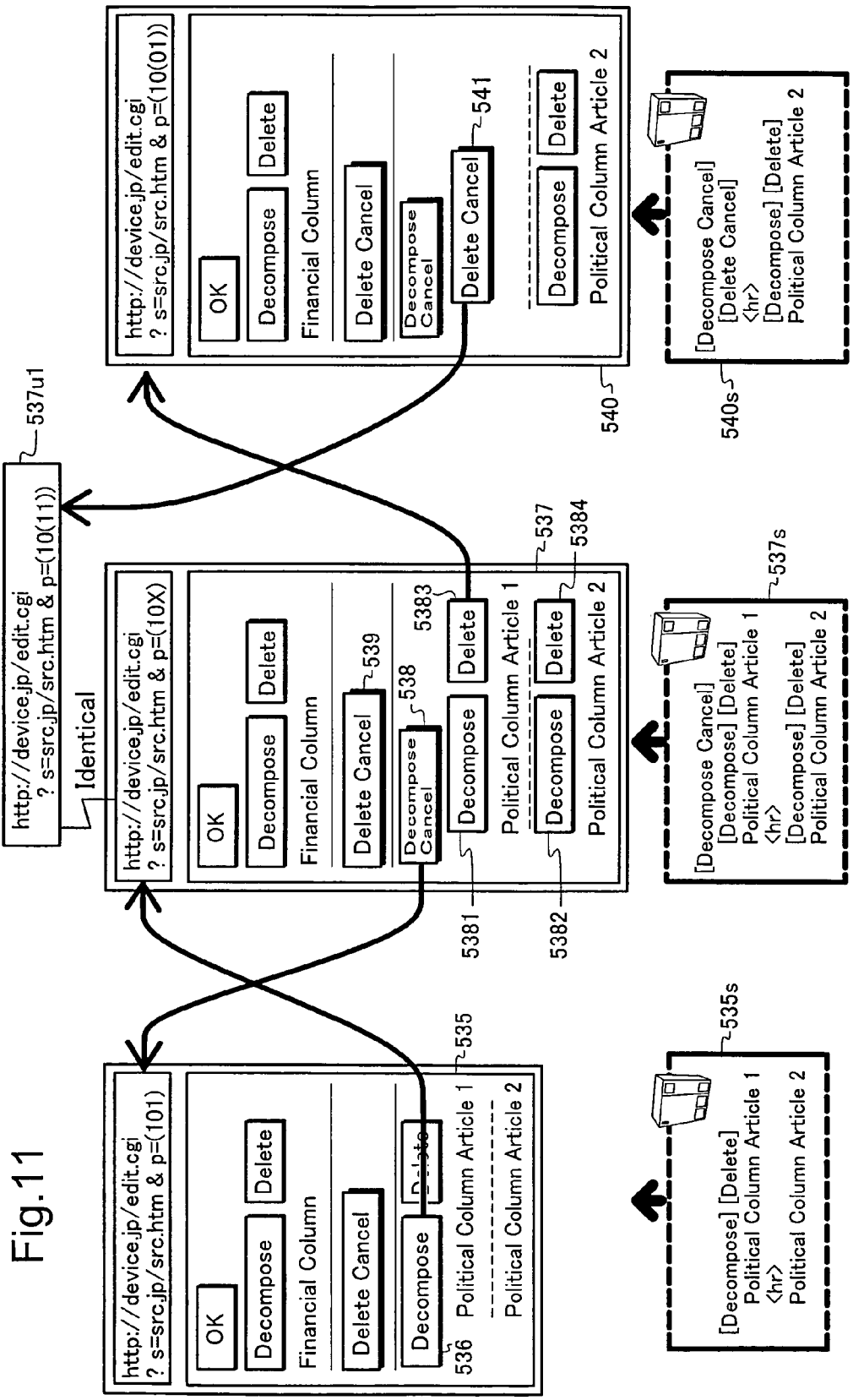
FIG. 11 shows an interface to decompose a division or to cancel such decomposition.

FIG. 11 shows an interface to decompose a division or to cancel such decomposition. The image output 535 on the left side of FIG. 11 is identical with the image output 535 shown in FIG. 10. A click of a Decompose button 536 in the political column on this interface creates an edited source file 537s and gives an image output 537 with the decomposed political column.

The Decompose button 536 functions as an interface to send a URL including division data 'p=(10X)' as shown in the center image output 537. Link data mapped to the Decompose button include the division data having a character 'X' assigned to the specified division with the button.

The editing server 400 receives the division data and expands the specified division to give division data 'p=(10 (11))' as shown by a URL 537u1. In the illustrated example, the political column has two branch divisions, a political column article 1 and a political column article 2. The political column article 1 has a Decompose button 5381 and a Delete button 5383, whereas the political column article 2 has a Decompose button 5382 and a Delete button 5384. These buttons are clicked to delete and decompose the respective political column articles 1 and 2.

The division corresponding to the political column further includes a Decompose Cancel button 538. The Decompose Cancel button 538 functions as an interface to send a URL including division data 'p=(101)' as shown in the image output 535 on the left side. A click of this button resumes the output of the political column.

A click of the Delete button 5383 attached to the political column article 1 in the image output 537 of FIG. 11 creates an edited source file 540s and gives an image output 540 excluding the political column article 1. A click of a Delete Cancel button 541 resumes display of the image output 537.

The procedure of the above example starts editing from the original source file. The editing operation may be resumed by entering an intermediate editing URL. The editing server 400 analyzes the parameter included in the URL and discriminates selected data from the URL of the original source file.

C3. Completion of Division Data

Figure 12:
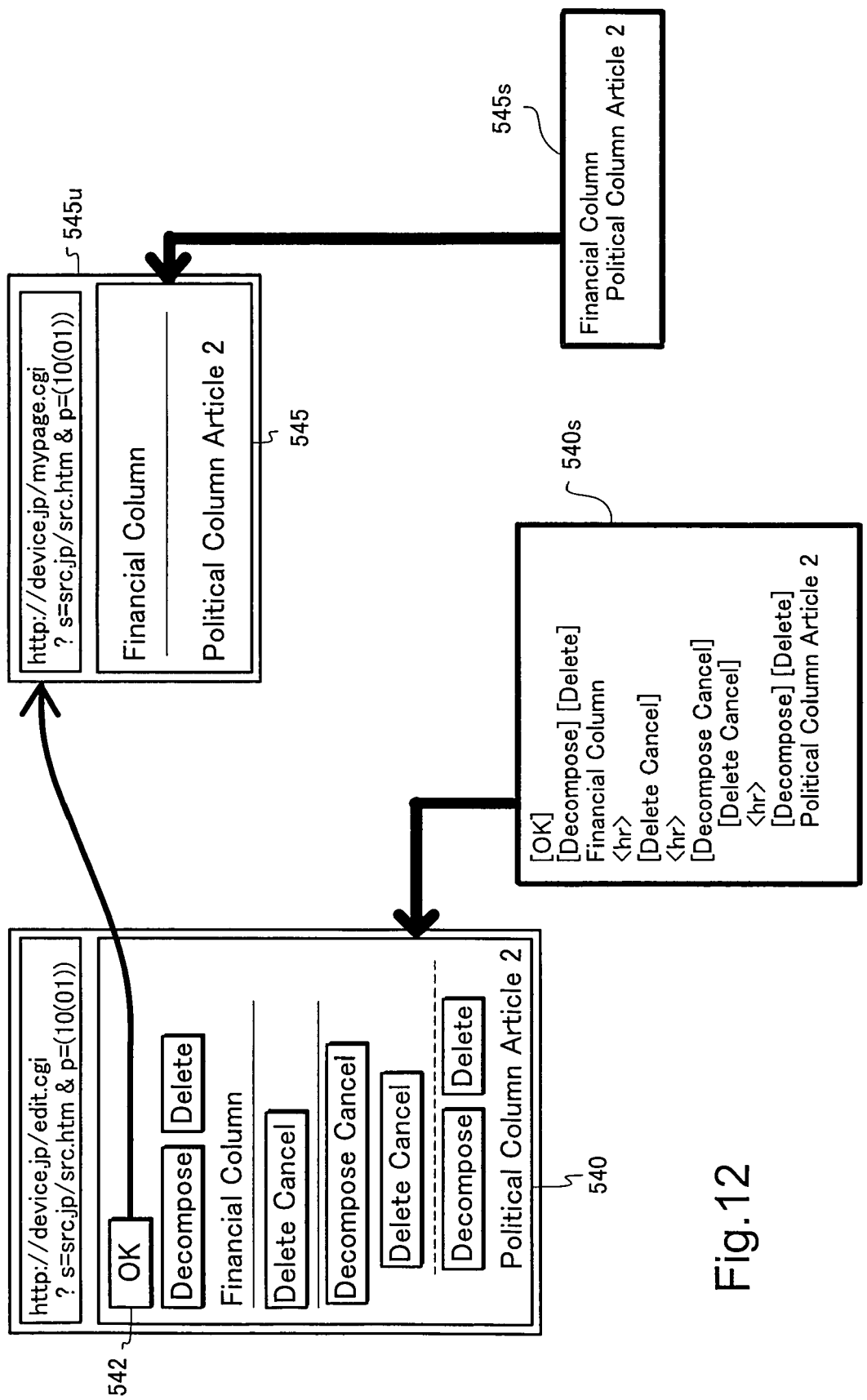
FIG. 12 shows an interface to terminate generation of division data.

FIG. 12 shows an interface to terminate generation of division data. The image output 540 shown on the left side is identical with the image output 540 on the right side of FIG. 11. The image output 540 corresponding to the edited source file 540s has an OK button 542 to terminate editing.

A click of the OK button 542 creates an edited source file 545s and gives an image output 545 excluding the editing-related buttons and the OK button as shown on the right side of FIG. 12. As shown in the image output 545, link data corresponding to the OK button 542 includes a CGI script name 'mypage.cgi' to allow the editing server 400 to output a resulting edited image.

Among the division data corresponding to the OK button 542, redundant division data may be converted into non-redundant division data. The redundant division data is suitable for addition of the editing-related buttons in the process of editing. Conversion into the non-redundant division data on completion of editing desirably compresses the volume of the division data.

The image output 545 is displayed on the browser with a URL 545u to display this resulting image output. This URL includes source file identification data for identifying the original source file and division data. The URL may be kept, for example, by the bookmark function. The user is only required to enter the URL in the browser, in order to re-display the image output 545.

The division data specifies the editing method of the original source file. In the case of updating the original source file, the editing specification is reflected on the updated original source file at the time of a re-display.

C4. Creation of Source File

Figure 13:
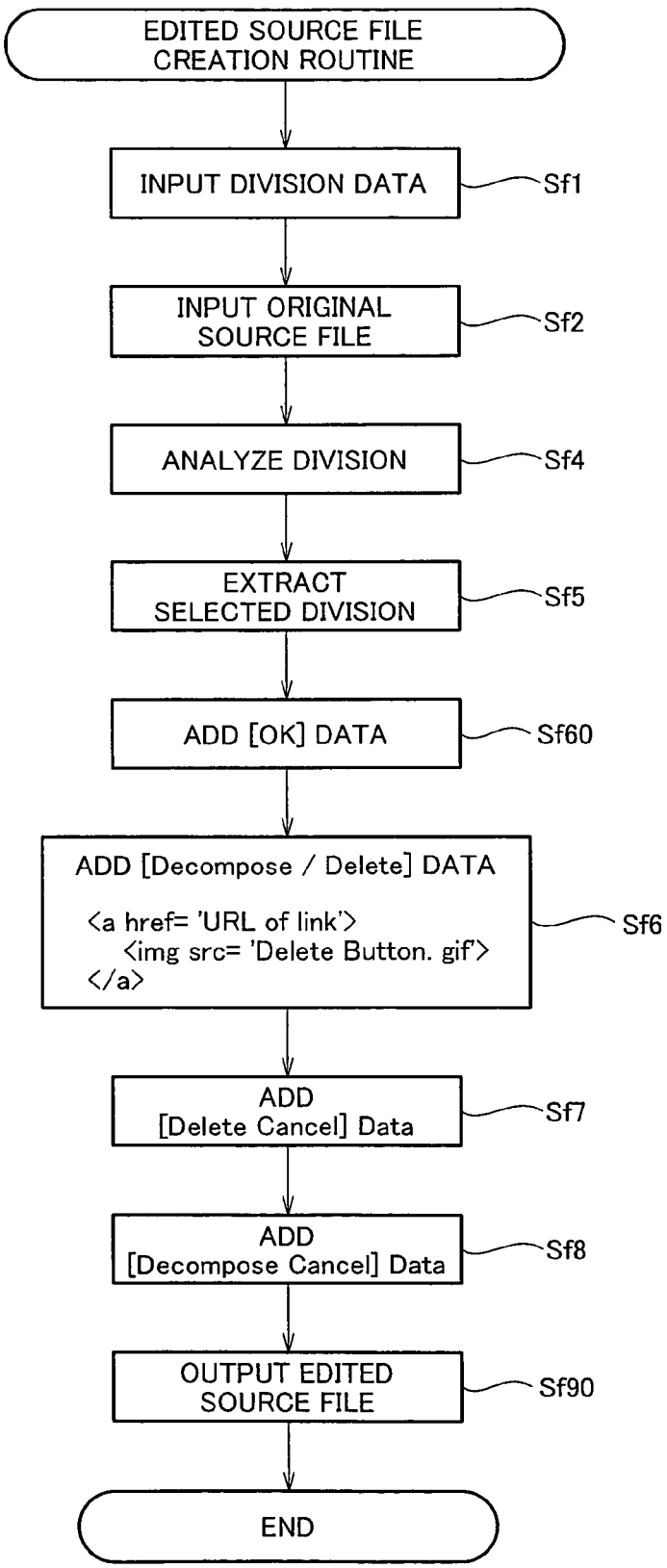
FIG. 13 is a flowchart showing an edited source file creation routine.

FIG. 13 is a flowchart showing an edited source file creation routine. The editing server inputs division data and an original source file respectively at steps Sf1 and Sf2.

At step Sf4, the editing server expands a division specified by the character 'X' included in the input division data, analyzes the division specified by the character 'X', creates a character string '(11 . . . 1)' including an array of '1' corresponding to the number of detected branch divisions, and substitutes the character string '(11 . . . 1)' for the character 'X'. For convenience of explanation, this division data is hereafter referred to as 'current division data'. At step Sf5, the editing server extracts a division as an object to be output (hereafter referred to as 'selected division'), according to the input division data.

At step Sf60, the editing server adds data for display of an OK button to the original source file. A CGI script included in a link of the OK button is 'mypage.cgi' for display of a resulting image output. Division data is identical with the current division data.

At step Sf6, the editing server adds data for displaying a Decompose button and a Delete button with regard to the selected division to the original source file.

An example of tag data for displaying the Delete button is added to the illustration. Insertion of this tag data into the original source file enables display of the Deleted button. The shape of the Delete button is specified by a button image file 'Delete Button. Gif'. The Delete button has a URL to a link in response to a click. The URL of the link of the Decompose button includes the current division data with substitution of the character 'X' for the character '1' representing the division with the button. The URL of the link of the Delete button includes the current division data with substitution of the character '0' for the character '1' representing the division with the button.

At step Sf7, the editing server adds data for displaying a Delete Cancel button with regard to the divisions other than the selected division to the original source file. A link of the Delete Cancel button includes the current division data with substitution of the character '1' for the character '0' representing the division with the button.

At step Sf8, the editing server adds data for displaying a Decompose Cancel button to the original source file. The Decompose button is displayed for a division specified by a character string '( . . . )' in the current division data. A link of the Decompose Cancel button includes the current division data with substitution of the character '1' for the character string '( . . . )' representing the division with the button.

The original source file, the results of previous structural analysis, and the results of previous editing based on the division data may be reused for creation of a new edited source file, like the first embodiment. Each division of the source file may be the unit of reuse. Reuse of the previous results is especially effective for sequential analyses of the divisions in the source file into the lower hierarchy. This desirably relieves the process load of the editing server 400.

One preferable procedure for effective reuse of the previous results sends a cookie to the browser of the client and allocates a number to the browser for session management of the browser.

After a start of editing the original source file, identification information may be allocated to each of the original source file and the edited source files. The allocated identification information is used for data management in each editing process. The identification information may be a number or an access file name of a duplicate of the original source file stored in the editing server 400. When the source file identification data includes this identification information, the intermediate edited source file may be regarded as the original source file in the editing process.

In the above description, each edited source file is created from the original source file. The division data accordingly determines whether each of the multiple divisions included in the original source file is the object to be output. In the editing session management, when the final edited source file is stored in the editing server 400, the division data is only required to identify the editing specification of this edited source file.

In one example, it is assumed that unique identification numbers are allocated to all the edited source files. A link of the editing-related button includes an identification number for identifying the final edited source file, data for specifying a division as an object to be edited, and data for identifying the editing specification (for example, deletion, division, cancellation of deletion, or cancellation of division). The data for identifying the editing specification may be the file name of a CGI script corresponding to each process.

In the case of reusing the previous edited source file, it is desirable that the URL of the link of the OK button includes the URL of the original source file and the division data for specifying the editing process to obtain the final edited source file from the original source file. This structure enables the URL of the link to be utilized independently from the editing process even after the edited source file is deleted from the editing server.

The system of the embodiment generates the division data for a desired image output by the simple series of processing. The client 500 is required to have only the general browser functions. This advantageously simplifies the structure of this system.

D. Fourth Embodiment

Figure 14:
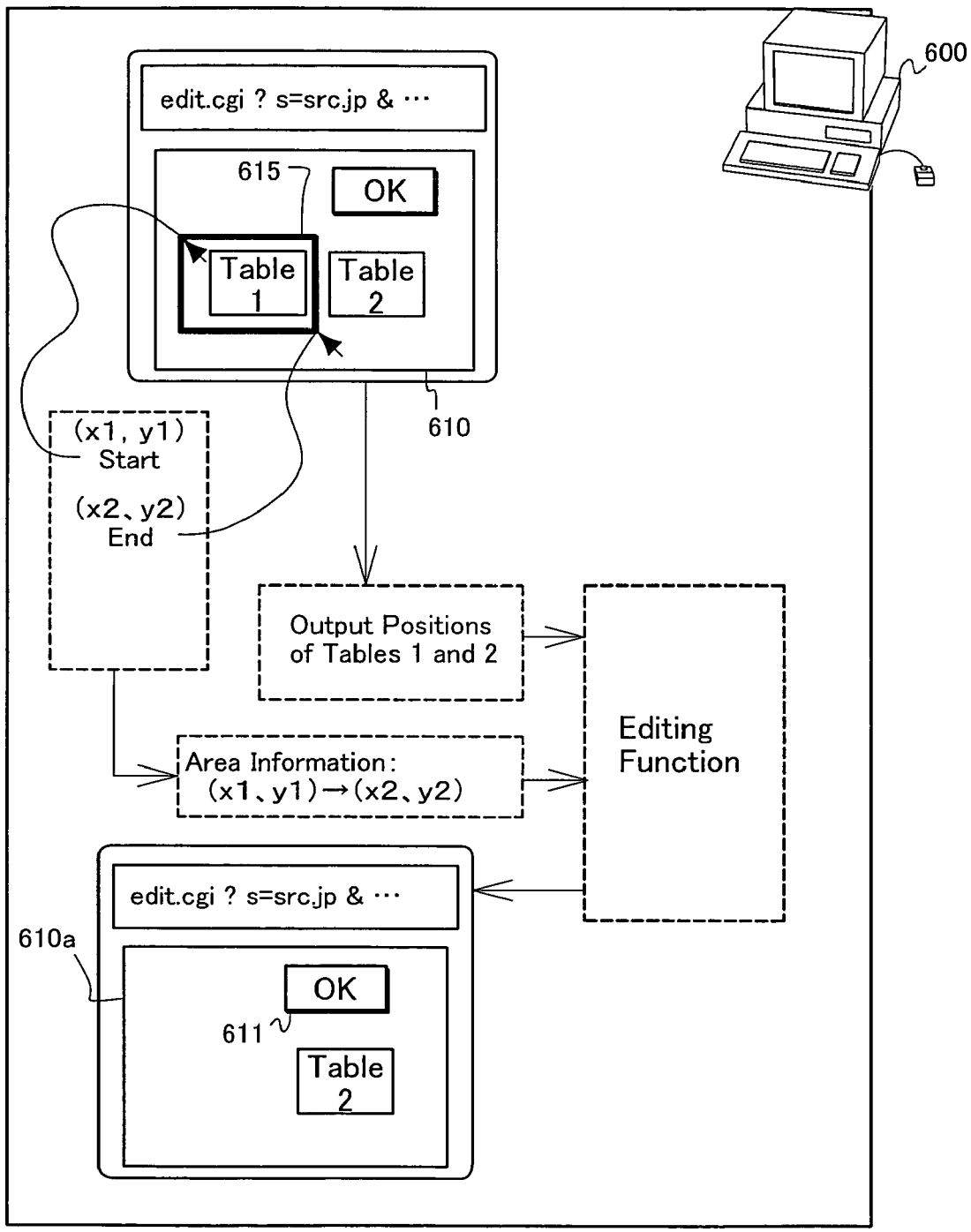
FIG. 14 shows a process of editing a source file and outputting the edited source file in a fourth embodiment.

FIG. 14 shows a process of editing a source file and outputting the edited source file in a fourth embodiment. Here a client 600 functions as a division data generation device and has an editing function to create an edited source file based on division data and a browser function to display the edited source file.

The configuration of modules relating to the editing function in the client 600 is similar to the module configuration of the first embodiment and is thus not specifically illustrated here. The client 600 of the fourth embodiment has a division specification module that specifies a division as an object to be edited, based on area information.

The editing function utilizes area information, which is specified on an image output, for example, by a mouse drag operation, for editing. The illustration of FIG. 4 also includes image outputs 610 and 141*a*.

The browser inputs area information for identifying an area 615 specified by the mouse drag operation on the image output 610. The area information is, for example, coordinates of two points (x1,y1) and (x2,y2) on a diagonal line for defining a rectangle.

In the illustrated example, the display of the image output includes Tables 1 and 2. The editing function detects selection of Table 1, based on the area information of the specified area 615 and the output positions of Tables 1 and 2, and creates an edited source file excluding Table 1. An image output 610*a* is accordingly displayed on the browser, based on this edited source file. A URL including division data for deletion of Table 1 from the original source file is provided together with the image output 610*a*, like the procedure of the previous embodiment.

The division data for deletion of a selected division is obtained by substituting the character '0' for the character '1' representing the selected division in the division data corresponding to the image output 610 (hereafter referred to as the 'current division data'). The procedure of the fourth embodiment specifies the selected division, irrespective of the format of the current division data. The current division data may, however, not include the character '1' representing the selected division. This is for example, the case in which a leaf division included in a branch division is specified as the selected division, while the current division data represents only the intermediate nested state specified by restricted analysis to the branch division. In this case, the preferable procedure further expands the current division data until the character '1' corresponding to the leaf division is obtained, and subsequently generates the division data with substitution.

Figure 15:
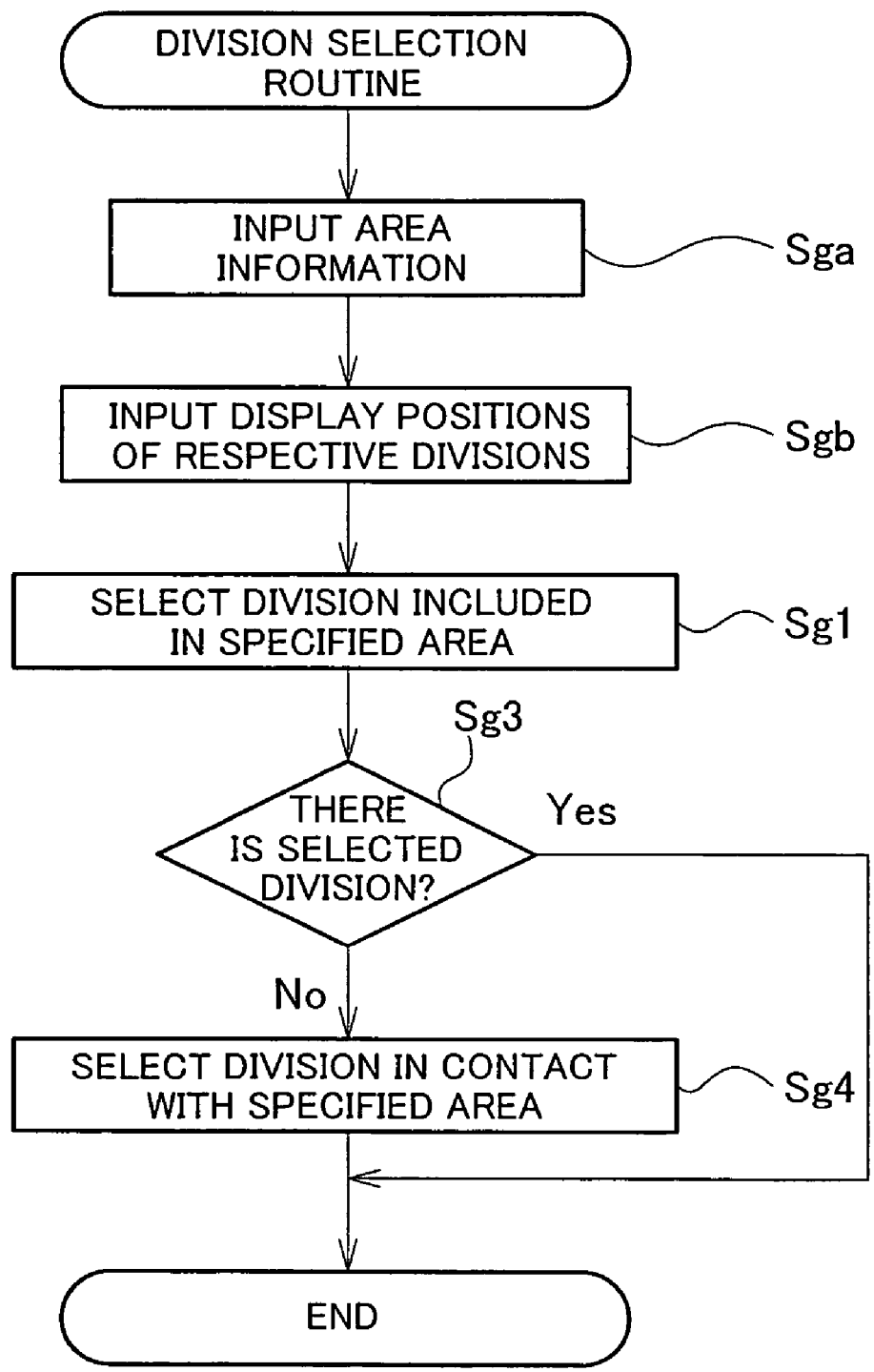
FIG. 15 is a flowchart showing a division selection routine.

FIG. 15 is a flowchart showing a division selection routine, which is executed by the division specification module in the client 600.

At steps Sga and Sgb, the division specification module inputs the area information and the display positions of the respective divisions in the image output. The former is specified by the mouse drag operation, and the latter is information depending upon the contents of the original source file and the display scale.

At step Sg1, the division specification module selects a division, which is included in the specified area. The procedure first analyzes the original source file and identifies divisions. The procedure then analyzes the inclusive relation of the respective divisions in the specified area. It is desirable that analysis of the inclusive relation is sequentially carried out from the greater display size division, that is, from the division closer to the root division. When any division that is completely included in the specified area is found, no further analysis is performed for the divisions in the lower hierarchy. The range of the hierarchy to be analyzed may be limited in advance.

At step Sg3, the division specification module determines the presence or the absence of any selected division. When there is any selected division, the division specification module specifies the selected division as the final selected division and terminates the division selection routine. When there is no selected division, the program goes to step Sg4.

At step Sg4, the division specification module selects a division, which is partly in contact with the specified area. Like the processing of step Sg1, it is desirable that analysis of the contact is sequentially carried out from the division closer to the root division. The processing of step Sg4 may be carried out simultaneously with the processing of step Sg1.

It is possible that no division is still selected at step Sg4. In such cases, the procedure does not select any division and exits from this processing routine.

The arrangement of the fourth embodiment may be combined with the editing method using the editing-related buttons.

One modified editing method may leave only one or multiple selected divisions specified by mouse drag operations and delete all the other divisions. Another modified procedure may select a division by the mouse drag operation and click an Area Delete button to delete the selected division. A 'Delete Cancel' button may be provided for cancellation of the deletion.

The area specified by the mouse drag operation is not restricted to the rectangular shape but may be a circular, a polygonal, or any other suitable shape.

The system of this embodiment enhances the user friendliness in editing. For example, the user is not required to operate the Decompose button many times but carries out editing in the units of divisions to the lower hierarchy from the root division, as well as collective editing of multiple divisions.

E. Fifth Embodiment

Figure 16:
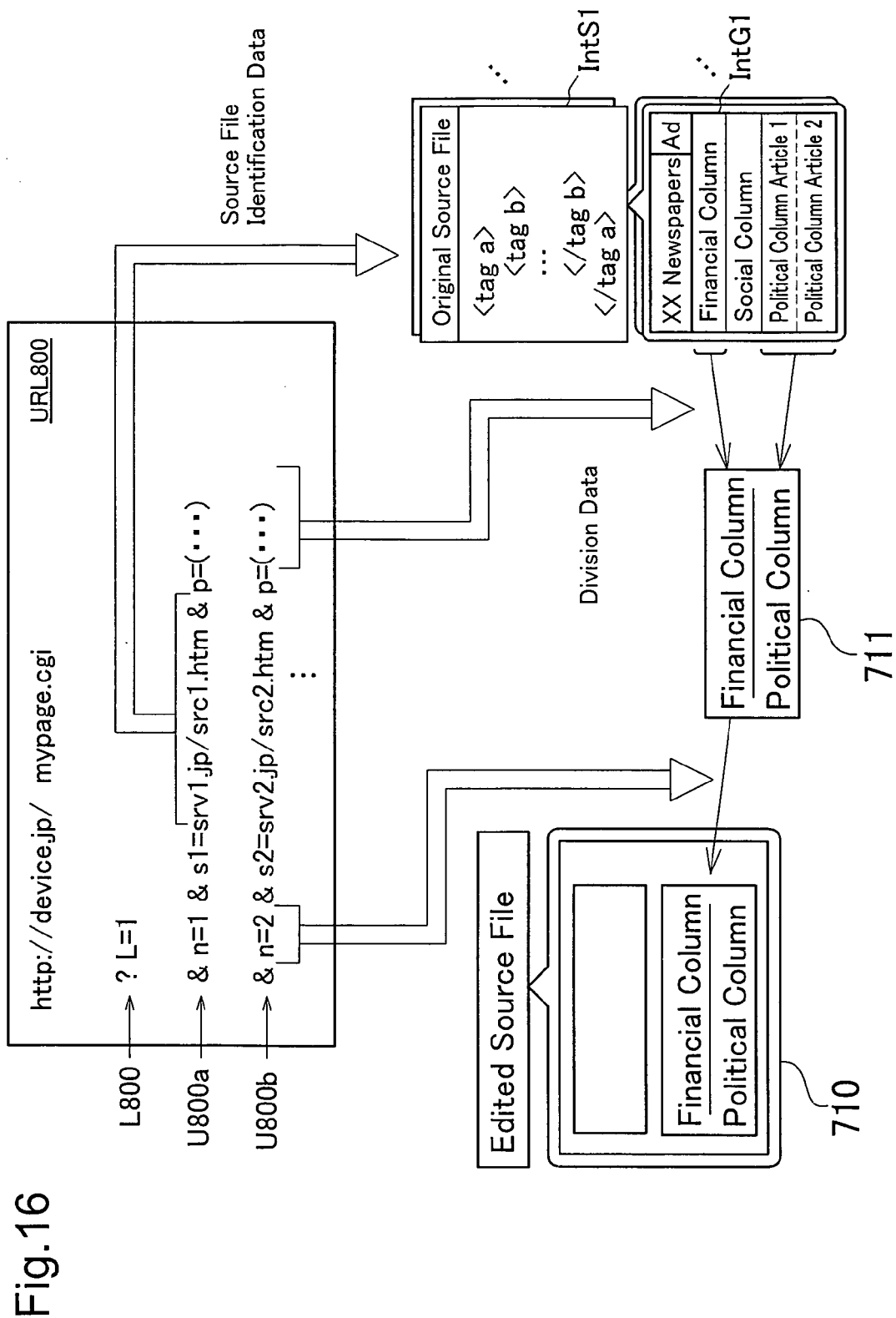
FIG. 16 shows an output example of editing result in a fifth embodiment.

FIG. 16 shows an output example of editing result in a fifth embodiment.

The editing server of the fifth embodiment edits multiple original source files to create multiple edited source files. The editing server also combines the multiple edited source files in a predetermined layout and creates a resulting edited source file (hereafter referred to as 'composite source file') to output a composite image. The printer, instead of the editing server, may have these functions. In the latter case, the printer of the fifth embodiment inputs an URL including multiple file source identification data and multiple division data, edits multiple original source files according to the respective division data, and prints out a resulting image in a predetermined layout.

A URL 800 shown as an example in FIG. 16 includes layout data L800 and specification dta U800*a* and U800*b* as parameters. Each of the specification data includes source file identification data, division data, and inserted position specification data. The inserted position specification data specifies a location, in which an image defined by an edited source file based on the corresponding division data is to be inserted.

As illustrated, the editing server of the fifth embodiment fetches multiple original source files IntS1, based on the source file identification data. The illustration also includes image outputs IntG1 corresponding to these original source files. The respective original source files are edited according to the division data. An edited source file gives, for example, an image output 711. The editing server arranges multiple edited source files thus obtained, based on the layout information to give a resulting image output 710. In this embodiment, 'n=1' means insertion into a first division in a layout frame, and 'n=2' means insertion into a second division in the layout frame. When the URL 800 is sent to the printer, the printer carries out the similar series of processing and prints the contents corresponding to the image output 710.

Figure 17:
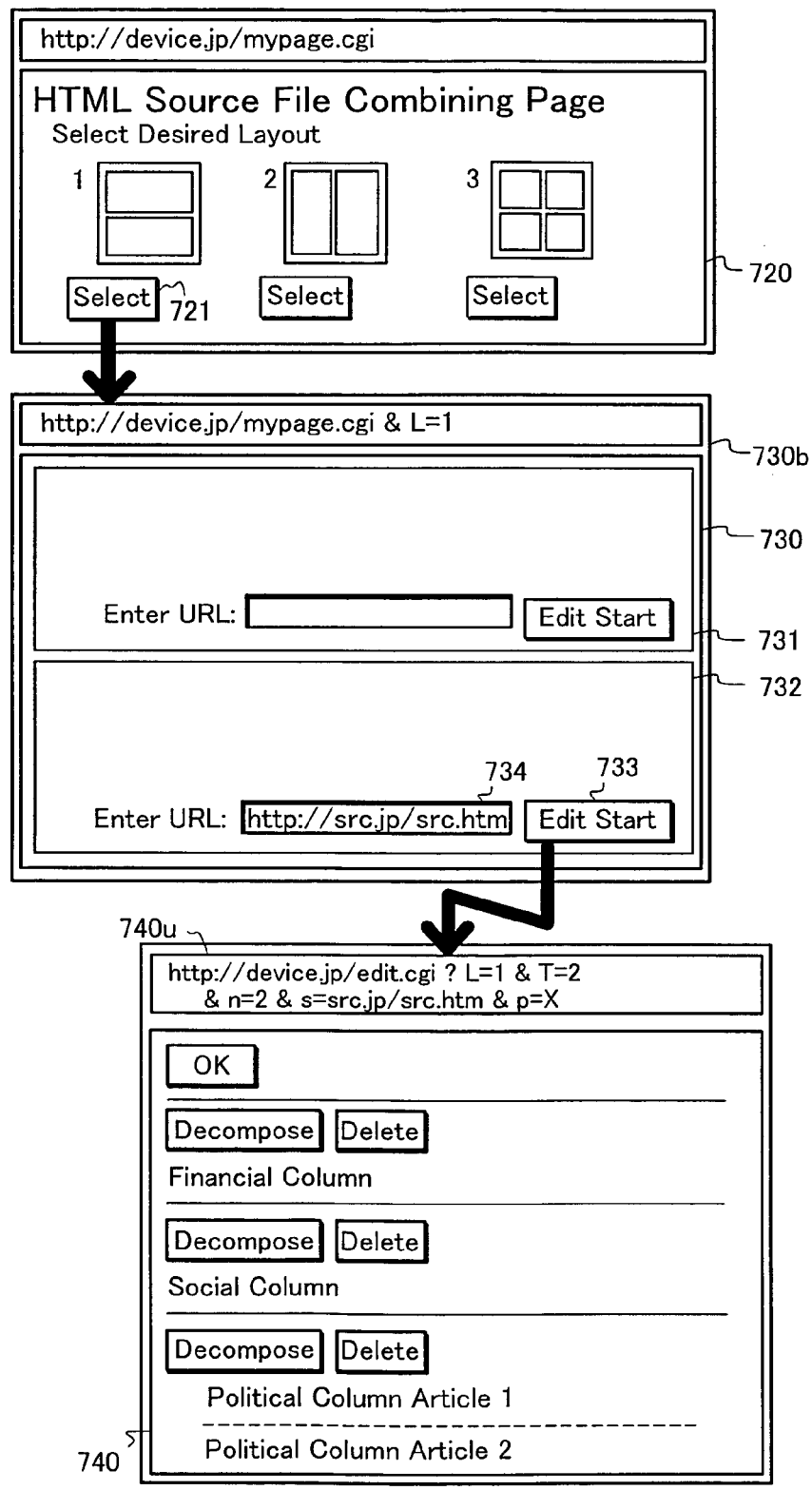
FIG. 17 shows an interface to utilize multiple original source files.

FIG. 17 shows an interface to utilize multiple original source files.

The user starts editing in an image output 720 to select a desired layout. The user selects a desired layout of divisions, in which multiple image outputs are to be embedded. The display of the image output 720 includes layout options 1 through 3. A click of a Select button attached to each layout option selects the corresponding layout option. Here it is assumed that the user clicks a Layout 1 Select button 721 corresponding to the layout option 1.

A click of the Select button 721 gives an image output 730 to start editing each layout division. In response to the click of the Select button 721, the editing server receives layout data 'L=1' (refer to a URL display box in a browser image 730*b*) and provides an edited source file, which has been prepared in advance, corresponding to the received layout data 'L=1'.

The user inputs a URL of a desired original source file in a URL input box 734 of the second division in the image output 730, and clicks an Edit Start button 733 of the second division. This gives an image output 740 for editing the second division.

Editing of the desired original source file is carried out in this image output 740 according to the series of processing discussed in the previous embodiment. In the structure of the fifth embodiment, the division data includes layout data. For example, the Edit Start button 733 of the second division has a link URL 'edit.cgi?L=1&T=2&n=2&s=src.jp/src.htm&p=X' as shown in a URL display box 740*u*.

This link URL includes layout data, division data, and inserted position specification data. The link URL also includes editing object data 'T=2' for identifying a layout division to be edited. This data shows that the current object to be edited is a second division in the layout frame.

Figure 18:
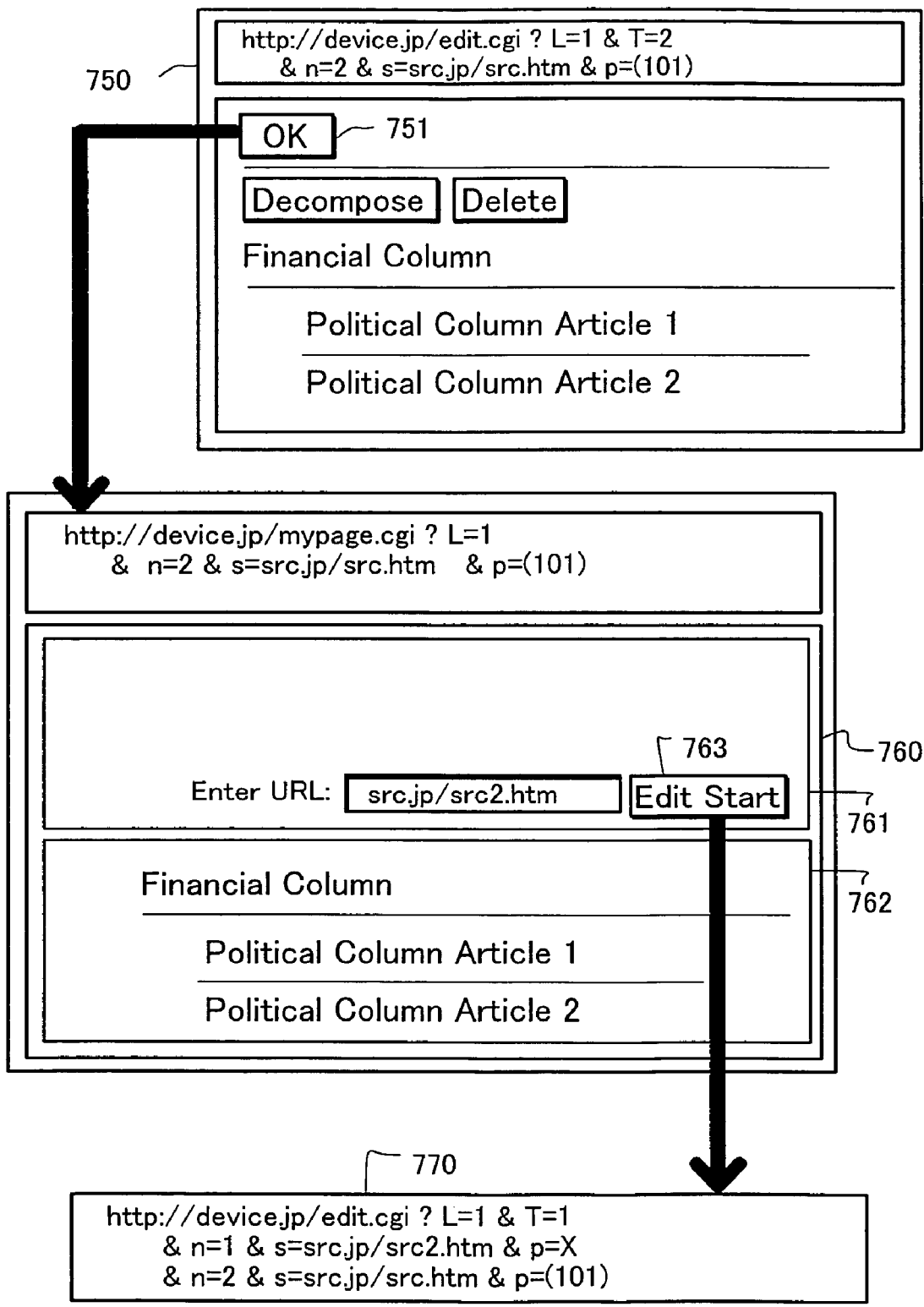
FIG. 18 shows an interface to terminate editing of an image output.

FIG. 18 shows an interface to terminate editing of an image output.

The user clicks an OK button 751 in a browser image 750 to terminate editing in the second division. The click of the OK button 751 gives an image output 760 of the edited second division. A click of an Edit Start button 763 in this image output 760 starts editing an image output to be inserted in the first division.

Specification data sent in response to a click of the Edit Start button 763 of the first division is combining specification data including multiple insertion specification data. The combining specification data here is 'edit.cgi?L=1&T=1&n=1&s=src.jp/src2.htm&p=X&n=2&s=src.jp/src .htm&p=(101)' as shown in a URL display box 770 to start editing a next layout division.

Completion of editing of image outputs to be inserted in all the divisions of the selected layout gives a composite source file as a combination of multiple original source files and a URL for displaying the composite source file.

A resulting image output 762 of the edited second division may have a button to resume editing of the image output inserted in this layout division.

The system of this embodiment easily attains output of a desired image, based on multiple original source files.

The image output device and the source file creation device of the invention are described above with reference to the several embodiments. These embodiments are to be considered in all aspects as illustrative and not restrictive. There may be many other modifications, changes, and alterations without departing from the scope or spirit of the main characteristics of the present invention. All changes within the meaning and range of equivalency of the claims are therefore intended to be embraced therein.

INDUSTRIAL APPLICABILITY

The technique of the invention is applicable to edit existing source files described in a markup language.

The invention claimed is:

1. An image output device that edits an original source file, which is described in a markup language including a preset tag, and outputs an image based on an edited source file, said image output device comprising:

a memory that stores modules, the stored modules comprising:

a specification input module that inputs specification information regarding specification of an image output and source file identification data for identifying the original source file;

a source file fetch module that fetches the original source file, based on the source file identification data, from a Web server that provides the original source file via the Internet;

a division module that divides the fetched original source file into divisions in a grammatical framework of the markup language;

an editing file generation module that generates an editing file by automatically adding at least one button to the fetched original source file, wherein the added button is for receiving from a user a request whether or not to output the divided division, without changing the original source file in the Web server;

a display module that displays the generated editing file;

an edited source file generation module that generates the edited source file by deleting an unnecessary divided division based on the request received via the button of the displayed generated editing file, without changing the original source file in the Web server; and an output module that outputs the generated edited source file, without changing the original source file in the Web server, wherein the button is automatically added to a division of the editing file, wherein the output module further outputs an identifier indicating a location of the original source file and location of division data generated by the edited source file generation module, wherein the identifier is output in a form of a uniform resource locator that identifies both the location of the original source file and the location of the division data, and wherein the uniform resource locator comprises a first character representing a first branch division of the division data to be output and a second character representing a second branch division of the divisional data to be deleted.

2. The image output device according to claim 1, wherein the output module outputs the generated edited source file based on the identifier.

3. The image output device according to claim 1, wherein the identifier is a uniform resource locator and wherein the uniform resource locator is stored as a bookmark.

4. The image output device according to claim 1, wherein an arrangement of the first and second characters represents locations of the first and second branch divisions in the division data.

* * * * *